(12) United States Patent
Badger et al.

(10) Patent No.: US 10,891,645 B2
(45) Date of Patent: Jan. 12, 2021

(54) TECHNOLOGIES FOR ENHANCED CREDIT TRANSACTIONS

(71) Applicant: Worldpay, LLC, Symmes Township, OH (US)

(72) Inventors: Brent Alan Badger, Powell, OH (US); Jacob Matthew Sterling, Creve Coeur, MO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 16/390,285

(22) Filed: Apr. 22, 2019

(65) Prior Publication Data

US 2019/0244234 A1 Aug. 8, 2019

Related U.S. Application Data

(63) Continuation of application No. 14/991,265, filed on Jan. 8, 2016, now Pat. No. 10,304,071.

(60) Provisional application No. 62/129,255, filed on Mar. 6, 2015.

(51) Int. Cl.
*G06Q 20/00* (2012.01)
*G06Q 30/02* (2012.01)
*G06Q 20/38* (2012.01)
*G06Q 20/20* (2012.01)
*G06Q 20/24* (2012.01)
(Continued)

(52) U.S. Cl.
CPC ......... *G06Q 30/0222* (2013.01); *G06Q 20/20* (2013.01); *G06Q 20/24* (2013.01); *G06Q 20/26* (2013.01); *G06Q 20/387* (2013.01); *G06Q 20/401* (2013.01); *G06Q 20/405* (2013.01); *G06Q 20/409* (2013.01); *G06Q 20/4012* (2013.01)

(58) Field of Classification Search
CPC .......................... G06Q 30/0222; G06Q 20/20
USPC .......................................................... 705/16
See application file for complete search history.

(56) References Cited

U.S. PATENT DOCUMENTS

| 2013/0304643 A1* | 11/2013 | Hirka ................. G06Q 20/3572 705/41 |
| 2015/0149271 A1* | 5/2015 | Battle ................. G06Q 30/0238 705/14.33 |

FOREIGN PATENT DOCUMENTS

WO    WO 2009/046157 A1    4/2009

* cited by examiner

*Primary Examiner* — Rokib Masud
(74) *Attorney, Agent, or Firm* — Bookoff McAndrews, PLLC

(57) ABSTRACT

Technologies for enhancing credit transactions include a point of sale computing system. The point of sale computing system receives payment vehicle data for a credit transaction associated with a purchase event. The point of sale computing system determines whether the credit transaction is an alternate routing candidate. The point of sale computing system routes an authorization request message to an issuer computing system via a payment card network in response to a determination that the credit transaction is not an alternate routing candidate. Alternatively, the point of sale computing system routes the authorization request message directly to the issuer computing system via a PIN debit network in response to a determination that the credit transaction is an alternate routing candidate. A corresponding authorization response message is received by the point (Continued)

of sale computing system via the payment card network or the PIN debit network. Other embodiments are described and claimed.

20 Claims, 8 Drawing Sheets

(51) Int. Cl.
*G06Q 20/40* (2012.01)
*G06Q 20/26* (2012.01)

TECHNOLOGIES FOR ENHANCED CREDIT TRANSACTIONS

CROSS REFERENCE TO RELATED APPLICATION

This patent application is a continuation of and claims the benefit of priority to U.S. application Ser. No. 14/991,265, filed Jan. 8, 2016, which claims the benefit of U.S. Provisional Patent Application Ser. No. 62/129,255, filed on Mar. 6, 2015, entitled SYSTEMS AND METHODS FOR ENHANCED PAYMENT TRANSACTIONS, the entire disclosures of which are hereby incorporated by reference in their entireties.

TECHNICAL FIELD

Embodiments of the technologies described herein relate, in general, to the field of enhancing credit transactions through the leveraging of a private communications network, such as a PIN debit network. More particularly, the systems and methods relate to the field of using out-of-band communication channels to facilitate credit authorizations and provide enhanced messaging.

BACKGROUND

Merchants can communicate with an acquirer processor in order to facilitate the merchant accepting a payment card as payment for goods or services. The electronic communications between the merchant and the acquirer can be restricted to a particular messaging specification or protocol.

SUMMARY

In an embodiment, the present disclosure is directed, in part, to a method for enhancing credit transactions. The method includes receiving, by a point of sale computing system, payment vehicle data for a credit transaction associated with a purchase event. The payment vehicle data can correspond to a payment vehicle tendered for the credit transaction. The method also includes determining, by the point of sale computing system, whether the credit transaction is an alternate routing candidate based at least in part on the payment vehicle data. In response to a determination that the credit transaction is not an alternate routing candidate, the method includes transmitting, by the point of sale computing system, an authorization request message for the credit transaction to an issuer computing system via a first communications channel and receiving, by the point of sale computing system, an authorization response message from the issuer computing system via the first communications channel. The issuer computing system is associated with the payment vehicle tendered for the credit transaction. Additionally, in response to a determination that the credit transaction is an alternate routing candidate, the method includes transmitting, by the point of sale computing system, the authorization request message for the credit transaction to the issuer computing system via a second communications channel different from the first communications channel, receiving, by the point of sale computing system, the authorization response message from the issuer computing system via the second communications channel, and finalizing, by the point of sale computing system, the credit transaction associated with the purchase event based on the authorization response message.

In another embodiment, the present disclosure is directed, in part, to a system for enhanced credit transactions. The system includes a point of sale computing device having a processor executing instructions stored in memory. The instructions, when executed, cause the processor to receive payment vehicle data for a credit transaction associated with a purchase event. The payment vehicle data corresponds to a payment vehicle tendered for the credit transaction. The instructions further cause the processor of the point of sale computing device to determine whether the credit transaction is an alternate routing candidate based at least in part on the payment vehicle data. In response to a determination that the credit transaction is not an alternate routing candidate, the instructions cause the processor of the point of sale computing device to transmit an authorization request message for the credit transaction to an issuer computing device via a first communications channel and receive an authorization response message from the issuer computing device via the first communications channel. The issuer computing device is associated with the payment vehicle tendered for the credit transaction. Additionally, in response to a determination that the credit transaction is an alternate routing candidate, the instructions cause the processor of the point of sale computing device to transmit the authorization request message for the credit transaction to the issuer computing device via a second communications channel different from the first communications channel, receive the authorization response message from the issuer computing device via the second communications channel; and finalize the credit transaction associated with the purchase event based on the authorization response message.

In another embodiment, the present disclosure is directed, in part, to a method for enhancing credit transactions. The method includes determining, by an issuer computing system, whether an authorization request message received from a point of sale computing device is received via a first communications channel or a second communications channel. The authorization request message corresponds to a credit transaction associated with a purchase event and the first communications channel is different from the second communications channel. In response to a determination that the authorization request message is received from the point of sale computing device via the first communications channel, the method includes generating, by the issuer computing system, an authorization response message for the credit transaction based at least in part on the authorization request message received from the point of sale computing system via the first communications channel and transmitting, by issuer computing system, the authorization response message for the credit transaction to the point of sale computing device via the first communications channel. Additionally, in response to a determination that the authorization request message is received from the point of sale computing device via the second communications channel, the method includes generating, by the issuer computing system, an authorization response message for the credit transaction based at least in part on the authorization request message received from the point of sale computing system via the second communications channel and transmitting, by issuer computing system, the authorization response message for the credit transaction to the point of sale computing device via the second communications channel.

In another embodiment, the present disclosure is directed, in part, to a system for enhanced credit transactions. The system includes an issuer computing device having a processor executing instructions stored in memory. The instructions, when executed, cause the processor to determine whether an authorization request message received from a point of sale computing device is received via a first communications channel or a second communications channel. The authorization request message corresponds to a credit transaction associated with a purchase event and the first communications channel is different from the second communications channel. In response to a determination that the authorization request message is received from the point of sale computing device via the first communications channel, the instructions cause the processor of the issuer computing device to generate an authorization response message for the credit transaction based at least in part on the authorization request message received from the point of sale computing device via the first communications channel and transmit the authorization response message for the credit transaction to the point of sale computing device via the first communications channel. Additionally, in response to a determination that the authorization request message is received from the point of sale computing device via the second communications channel, the instructions cause the processor of the issuer computing device to generate an authorization response message for the credit transaction based at least in part on the authorization request message received from the point of sale computing device via the second communications channel and transmit the authorization response message for the credit transaction to the point of sale computing device via the second communications channel.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
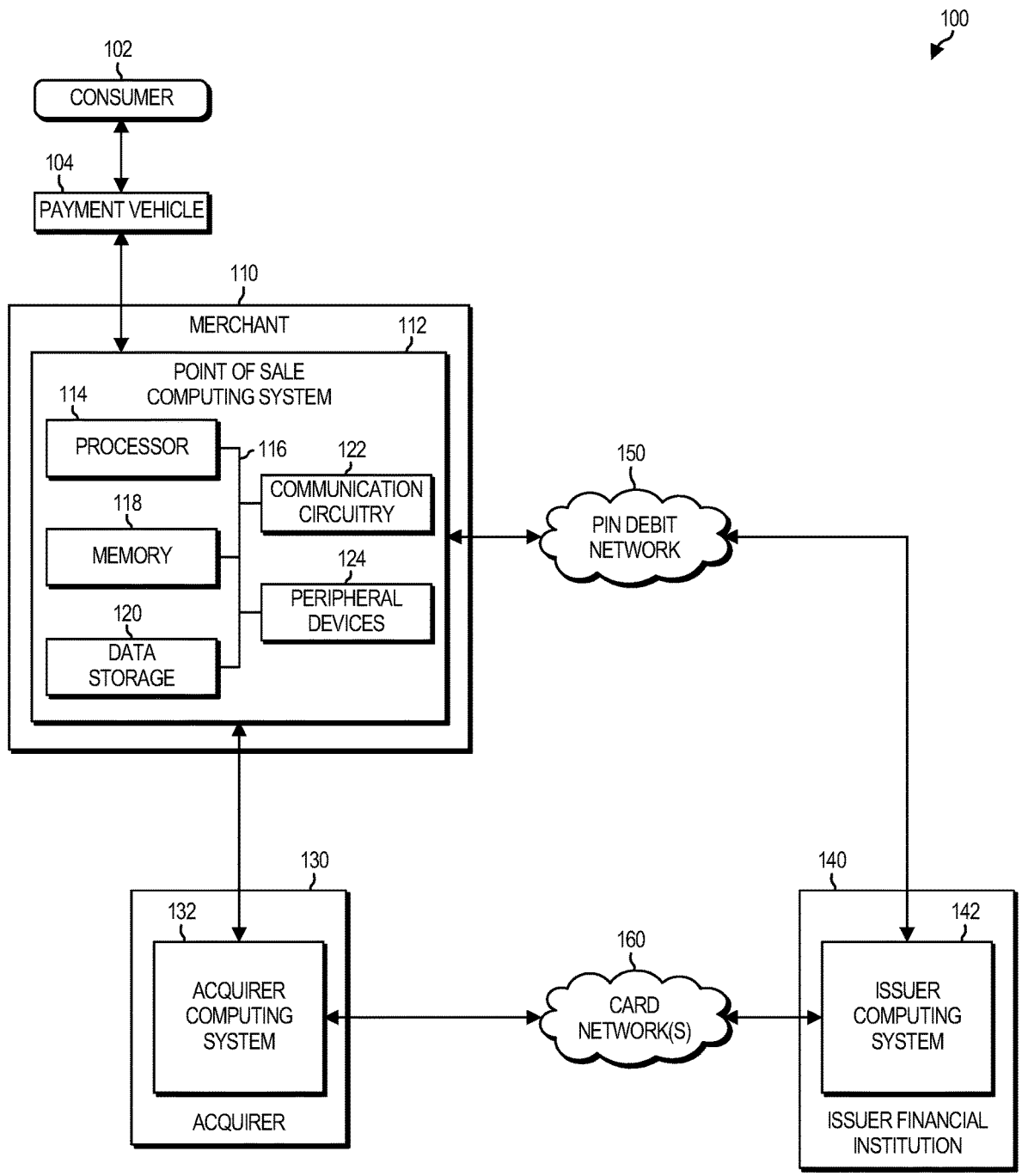
FIG. 1 is a simplified block diagram of at least one embodiment of a system for leveraging a PIN debit network to provide enhanced credit processing and messaging.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

As is known in the art, merchants typically communicate with an acquirer processor (sometimes called a merchant processor or a merchant acquirer) in order to facilitate the merchant accepting a payment card as payment for goods or services. The electronic communications between the merchant and the acquirer are generally restricted to a particular messaging specification or protocol, thereby limiting the opportunity to provide enhanced messaging using that communication stream. As such, there exists a need for alternative payment systems and methods that allow merchants, consumers, and/or other entities, such as card issuers, to enjoy enhanced payment and credit transaction experiences. In accordance with the present disclosure, a PIN debit network or other type of private communications network can allow for additional messaging between the merchant and the issuer or between the merchant and the acquirer. The PIN debit network and other private communications networks of the present disclosure can be pre-existing, closed-loop communication channels connecting a point of sale (POS) computing system of a merchant to a third party, such as an acquirer computing system of an acquirer, an issuer computing system of an issuer financial institution, and any other entity or computing device. Conventional PIN-based transactions are routed through a PIN debit network instead of a card network operated by a card brand, such as VISA or MASTERCARD. In some configurations, the PIN debit network is a one-to-many network, connecting a plurality of POS computing systems to a single acquirer computing system, issuer computing system, or other computing device or connecting a single POS computing system to multiple computing devices (e.g., acquirer computing system(s), issuer financial institution(s), redemption platform operator(s), etc.). Additionally, in some embodiments, the PIN debit network is a many-to-many network connecting a plurality of POS devices to multiple computing devices. In accordance with the present disclosure, these pre-existing communications channels can be configured to facilitate the enhanced messaging and processing described herein. By utilizing pre-existing communications channels (such as a PIN debit network) integration efforts needed to implement the technologies described herein can be reduced.

Referring now to FIG. 1, in one embodiment, a system 100 for providing enhanced credit processing and messaging includes a merchant 110, an acquirer 130, an issuer financial institution 140, a PIN debit network 150, and one or more card networks 160. As described in more detail below, the PIN debit network 150 can be leveraged as an out-of-band communications network configured to support enhanced payment or credit transaction messaging between a point of sale (POS) computing system 112 of the merchant 110 and an issuer computing system 142 of the issuer financial institution 140. In doing so, it should be appreciated that the PIN debit network 150 can be configured to capture, bundle, and communicate various types of data (e.g., financing offer data, credit line increase offer or request data, balance transfer offer or request, discount offer data, new account offer or request data, interest rate acknowledgement data, electronic terms and conditions acceptance data, new account application data, etc.) between payment devices and systems that cannot otherwise be communicated over traditional payment card networks 160 due to strict financial transaction messaging specifications (e.g., ISO 8583, etc.) and/or protocol requirements.

In an embodiment, the POS computing system 112 receives payment vehicle data associated with a payment vehicle 104 tendered by a consumer 102 for a credit transaction. The credit transaction can correspond to the purchase of goods or services (e.g., a purchase event) by the consumer 102. Based on the payment vehicle data and/or other transaction-specific parameters, the POS computing system 112 determines whether to directly route an authorization request message for the credit transaction to the issuer computing system 142 via the PIN debit network 150 or whether to route the authorization request message to the issuer computing system 142 via the card network(s) 160 (and any intermediary computing systems such as the acquirer computing system 132) using traditional credit processing techniques and messaging. In embodiments in which the authorization request message is directly routed to the issuer computing system 142 via the PIN debit network 150, the POS computing system 112 can utilize the PIN debit network 150 to communicate additional types of data that could not otherwise be communicated via the card network(s) 160 due to strict financial transaction messaging specifications and protocols. In that way, the PIN debit network 150 can be configured to provide a flexible and bi-directional communications channel between the POS computing system 112 and the issuer computing system 142 (and any other computing device communicatively coupled thereto).

Upon receipt of the authorization request message, the issuer computing system 142 can generate an authorization response message, which can be directly transmitted to the POS computing system 112 via the PIN debit network 150. The POS computing system 112 can finalize the credit transaction based at least in part on, or otherwise as a function of, the received authorization response message. In some embodiments, upon receipt of the authorization request message and prior to generation of the authorization response message, the issuer computing system 142 can be configured to request additional data from the consumer 102 via the PIN debit network 150 and the POS computing system 112. As discussed herein, such additional data can correspond to an offer related to the credit transaction and/or an account of the consumer 102. In such embodiments, the issuer computing system 142 can be configured to generate a response request message, which can be directly transmitted to the POS computing system 112 via the PIN debit network 150. The issuer computing system 142 can be configured to receive response data from the POS computing system 112 via the PIN debit network 150. The received response data can be based on the response request message transmitted to the POS computing system 112. In some embodiments, the response data can be elicited from the consumer 102 via the POS computing system 112 (or a computing or input device associated therewith). It should be appreciated that such response data (e.g., additional or non-conforming transaction data, consumer data, loyalty data, offer data, account data, SKU data, etc.) cannot be transmitted via the card network(s) 160 due to the strict financial transaction messaging specifications and protocols employed. Subsequently, the issuer computing system 142 can generate the authorization response message based at least in part on the received response data.

In other illustrative embodiments, the POS computing system 112 receives payment vehicle data associated with a payment vehicle 104 tendered by a consumer 102 for a credit transaction. In such embodiments, the POS computing system 112 transmits an authorization request message for the credit transaction to the issuer computing system 142 via the card network(s) 160. Additionally, the POS computing system 112 transmits an enhanced data message to the issuer computing system 142 via the PIN debit network 150. The enhanced data message includes additional types of data (e.g., additional transaction data, non-conforming transaction data, consumer data, loyalty data, offer data, account data, SKU data, etc.) that cannot otherwise be communicated via the card network(s) 160 due to the strict financial transaction messaging specifications and protocols employed. In that way, the PIN debit network 150 can be configured to provide a flexible and bi-directional communications channel between the POS computing system 112 and the issuer computing system 142 (and any other computing device communicatively coupled thereto).

The issuer computing system 142 can be configured to match the authorization request message received from the POS computing system 112 via the card network(s) 160 with the enhanced data message received from the POS computing system 112 via the PIN debit network 150. In some embodiments, after matching the authorization request message with the enhanced data message, the issuer computing system 142 can be configured to generate an authorization response message, which can be transmitted to the POS computing system 112 via the card network(s) 160 and any intermediary devices (e.g., the acquirer computing system 132, etc.). The POS computing system 112 can be configured to finalize the credit transaction based on the received authorization response message.

In other embodiments, after matching the authorization request message with the enhanced data message, the issuer computing system 142 can be configured to determine whether a response from the consumer 102 is required as part of the credit transaction. In such embodiments, the issuer computing system 142 can transmit a response request message to the POS computing system 112 via the PIN debit network 150. Subsequently, the issuer computing system 142 can process response data received from the POS computing system 112 via the PIN debit network 150. Thereafter, the issuer computing system 142 can be configured to generate an authorization response message, which can be based on the enhanced data message and the response data received from the POS computing system 112. The authorization response message can be transmitted to the POS computing system 112 via the card network(s) 160 for finalization of the credit transaction.

The consumer 102, sometimes referred to as a cardholder, bank cardholder, or card member, can provide information from a payment vehicle 104 to the POS computing system 112 to initiate a payment or credit transaction with the merchant 110. The payment or credit transaction can correspond to a purchase event. As discussed, the payment vehicle 104 can be embodied as any type of physical or virtual payment vehicle having account information (e.g., an account number or other account indicative information) associated therewith.

The merchant 110 can be embodied as any type of retailer, service provider, vendor, or any other type of entity that sells, or offers to sell, a good and/or service. To facilitate sales and accounting activities, the merchant 110 can include various communication networks and computing devices (e.g., sales terminals, back-end servers, payment entry devices, card readers, mobile devices, etc.). For example, as illustratively shown, the merchant 110 includes the POS computing system 112. Of course, the merchant 110 can include other computing devices or architectures commonly used by retail merchants, which are not illustrated in FIG. 1 for clarity of the description. In some embodiments such as the one shown in FIG. 1, the merchant 110 (or computing devices thereof) can be in networked communication with the acquirer computing system 132 and use the payment/credit processing services of the acquirer computing system 132. Payment/credit processing services can include receiving and responding to authorization requests as well as facilitating the settlement of funds associated with payment/credit card-based transactions occurring at the merchant 110.

The POS computing system 112 can be embodied as a computing device or server capable of processing, communicating, storing, maintaining, and transferring data. For example, the POS computing system 112 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the POS computing system 112 can be embodied as a computing device integrated with other systems or subsystems. In the illustrative embodiment of FIG. 1, the POS computing system 112 includes a processor 114, a system bus 116, a memory 118, a data storage 120, communication circuitry 122, and one or more peripheral devices 124. Of course, the POS computing system 112 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 118, or portions thereof, can be incorporated in the processor 114 in some embodiments. Furthermore, it should be appreciated that the POS computing system 112 can include other components, sub-components, and devices commonly found in a computer and/or computing device, which are not illustrated in FIG. 1 for clarity of the description.

The processor 114 can be embodied as any type of processor capable of performing the functions described herein. For example, the processor 114 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the POS computing system 112 includes a system bus 116 for interconnecting the various components of the POS computing system 112. The system bus 116 can be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations with the processor 114, the memory 118, and other components of the POS computing system 112. In some embodiments, the POS computing system 112 can be integrated into one or more chips such as a programmable logic device or an application specific integrated circuit (ASIC). In such embodiments, the system bus 116 can form a portion of a system-on-a-chip (SoC) and be incorporated, along with the processor 114, the memory 118, and other components of the POS computing system 112, on a single integrated circuit chip.

The memory 118 can be embodied as any type of volatile or non-volatile memory or data storage capable of performing the functions described herein. For example, the memory 118 can be embodied as read only memory (ROM), random access memory (RAM), cache memory associated with the processor 114, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 118 can store various data and software used during operation of the POS computing system 112 such as operating systems, applications, programs, libraries, and drivers.

The data storage 120 can be embodied as any type of device or devices configured for short-term or long-term storage of data such as, for example, memory devices and circuits, memory cards, hard disk drives, solid-state drives, or other data storage devices. For example, in some embodiments, the data storage 120 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 114, or the memory 118 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 122 of the POS computing system 112 can be embodied as any type of communication circuit, device, interface, or collection thereof, capable of enabling communications between the POS computing system 112 (or other computing devices associated with a merchant 110) and the acquirer computing system 132 (or other computing devices of an acquirer 130), the PIN debit network 150 (or computing devices associated therewith), the card network(s) 160 (or computing devices associated therewith), the issuer computing system 142 (or other computing devices of an issuer financial institution 140), and/or any other computing device communicatively coupled thereto. For example, the communication circuitry 122 can be embodied as one or more network interface controllers (NICs), in some embodiments. The communication circuitry 122 can be configured to use any one or more communication technologies (e.g., wireless or wired communications) and associated protocols (e.g., Ethernet, WiMAX, etc.) to effect such communication.

In some embodiments, the POS computing system 112 (or other computing devices associated with the merchant 110), the acquirer computing system 132 (or other computing devices of the acquirer 130), the PIN debit network 150 (or computing devices associated therewith), the card network(s) 160 (or computing devices associated therewith), the issuer computing system 142 (or other computing devices of the issuer financial institution 140), and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communications between the computing devices of the system 100.

Additionally, in some embodiments, the POS computing system 112 can further include one or more peripheral devices 124. Such peripheral devices 124 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the POS computing system 112 can include a card reader or a PIN pad configured to facilitate receipt of a payment vehicle 104 or a payment card for a purchase or payment transaction (e.g., a credit or debit transaction). The POS computing system 112 can be configured to perform certain business-related functions, such as, without limitation, sales tabulation, inventory management, scheduling, accounting processes, payroll, and the like. Additionally, in some embodiments, the POS computing system 112 can include payment hardware and functionality configured for receiving traditional payment cards containing magnetic stripes (e.g., magstripes, swipe cards, etc.). The POS computing system 112 can also include payment hardware and functionality configured for receiving payment cards via Near Field Communication (NFC) technologies, BLUETOOTH communication technologies, and other contactless and/or short-range wireless communication technologies. Additionally or alternatively, in some embodiments, the POS computing system 112 can include integrated circuit payment hardware and functionality configured for receiving a EUROPAY, MASTERCARD, AND VISA (EMV) payment card or other smartcard or chip-based card. The POS computing system 112 can include any other type of payment hardware and functionality for receiving a payment card or vehicle. As used herein, the term POS computing system 112 is used broadly to include POS systems at brick-and-mortar locations and "virtual" POS systems and devices that can be associated with an online retailer, "in-app" purchases, or other types of card not present (CNP) transactions.

The POS computing system 112 can facilitate the transmission of transaction-related information to the acquirer computing system 132, as is known in the art. The transaction-related information can comprise an authorization request as well as other types of identifying indicia. The identifying indicia can vary based on the POS computing system 112, the type of merchant 110, and the type of transaction, but example types of identifying indicia can include any of the following: a merchant identification number (MID) identifier; a loyalty program identifier; a bank identification number (BIN) or other bank identifier associated with the payment vehicle 104 tendered in the payment/credit transaction corresponding to the purchase event; an account identifier associated with the payment vehicle 104 tendered in the payment/credit transaction corresponding to the purchase event; a merchant category code (MCC) identifier; a media access control (MAC) identifier; an Internet Protocol (IP) identifier; a geographic identifier; a payment type identifier; a consumer identifier (e.g., a consumer name, a consumer address, a consumer phone number, a consumer email address, a unique consumer number, etc.) associated with a consumer 102 engaged in the purchase event; and/or a cardholder identifier (e.g., a cardholder name, a cardholder address, a cardholder phone number, a cardholder email address, a unique cardholder number, etc.) associated with the payment vehicle 104 tendered in the credit/payment transaction corresponding to the purchase event.

In the illustrative embodiment, the POS computing system 112 communicates with the issuer computing system 142 (or other computing devices associated with the issuer financial institution 140) over the PIN debit network 150. The PIN debit network 150 is generally a type of a private communications network that governs and processes purchase and payment transactions where the consumer is validated through the combination of presentment of a plastic card and entry of a PIN or signature. Typical debit payment brand networks include STAR, PULSE, MAESTRO USA, JEANIE and INTERLINK. The PIN debit network 150 can be an established or pre-existing communication channel between the POS computing system 112 and a third party, such as, for example, the issuer computing system 142 of the issuer financial institution 140, the acquirer computing system 132 of the acquirer 130, and/or any other entity or computing device.

As described herein, the PIN debit network 150 can be used as a private communications network directly or indirectly connecting a merchant 110 to the issuer financial institution 140 and/or other entities. Unlike traditional payment or card networks 160 that often have regimented transaction messaging specifications and protocols, the PIN debit network 150 can offer flexibility with regard to the messaging format and content, thereby allowing a merchant 110, issuer financial institution 140, or other entity to offer enhanced features to a variety of stakeholders. In that way, the PIN debit network 150 is embodied as a communications network out-of-band from the card network(s) 160.

The acquirer computing system 132 of the acquirer 130 can be embodied as any type of computing or payment device capable of performing the functions described herein. As such, the acquirer computing system 132 can include devices and structures commonly found in computing devices such as processors, memory devices, communication circuitry, and data storages, which are not shown in FIG. 1 for clarity of the description. In the illustrative embodiments, the acquirer computing system 132 communicates with the issuer computing system 142 (or other computing devices associated with the financial institution 140) over the one or more payment or card networks 160. The card network(s) 160 can be, for example, a network of a credit card association affiliated with a payment vehicle or payment card. Non-limiting examples of credit card associations include VISA, MASTERCARD, DISCOVER, and AMERICAN EXPRESS. In some embodiments, the card network(s) 160 receive an authorization request message from the acquirer computing system 132 for a credit or payment transaction. The card network(s) 160 can provide the authorization request message to a payment processing server of an issuer processor (not shown), which in turn can provide the authorization request message to the issuer computing system 142 (or other computing device) of the issuer financial institution 140. The issuer financial institution 140 (via the issuer computing system 142 or other computing device) can then associate the payment vehicle 104 or payment card used with an account held by the issuer financial institution 140. Thereafter, the issuer financial institution 140 can transmit an authorization response message to the card network(s) 160 via the issuer processor. In response to receiving the authorization response message, the card network(s) 160 can transmit the authorization response message to the acquirer computing system 132. In some embodiments, the card network(s) 160 include a payment gateway (not shown) configured to facilitate the acquirer computing system 132 or, more generally, merchants 110 in processing payment and purchase transactions.

The issuer computing system 142 of the issuer financial institution 140 can be embodied as any type of computing device capable of performing the functions described herein. As such, the issuer computing system 142 can include devices and structures commonly found in computing devices such as processors, memory devices, communication circuitry, and data storages, which are not shown in FIG. 1 for clarity of the description. In the illustrative embodiment, the issuer computing system 142 receives authorization request messaging (e.g., credit or payment authorization request messages) either directly from the POS computing system 112 via the PIN debit network 150 or indirectly from the POS computing system 112 via the acquirer computing system 132 and the card network(s) 160. The issuer computing system 142 is also configured to generate and transmit an authorization response message either directly to the POS computing system 112 via the PIN debit network 150 or indirectly to the POS computing system 112 via the acquirer computing system 132 and the card network(s) 160. As described in more detail below, the issuer computing system 142 is also configured to bi-directionally communicate with the POS computing system 112 via the PIN debit network 150. For example, the issuer computing system 142 can be configured to provide special financing offers to the consumer 102 via direct communications with the POS computing system 112. The issuer computing system 142 can also be configured to electronically accept new account applications from the consumer 102 via direct communications with the POS computing system 112. In another example, the issuer computing system 142 is configured to electronically interact with the consumer 102 via the POS computing system 112 to offer and/or approve credit line increases. It should be appreciated that such types of data and messaging cannot be communicated over traditional payment card networks 160 due to strict financial transaction messaging specifications (e.g., ISO 8583, etc.) and/or protocol requirements employed.

In some embodiments, the POS computing system 112 (or other computing devices of the merchant 110), the PIN debit network 150 (or computing devices thereof), the card network(s) 160 (or computing devices thereof), the acquirer computing system 132 (or other computing devices of the acquirer 130), and the issuer computing system 142 (or other computing devices of the issuer financial institution 140) can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
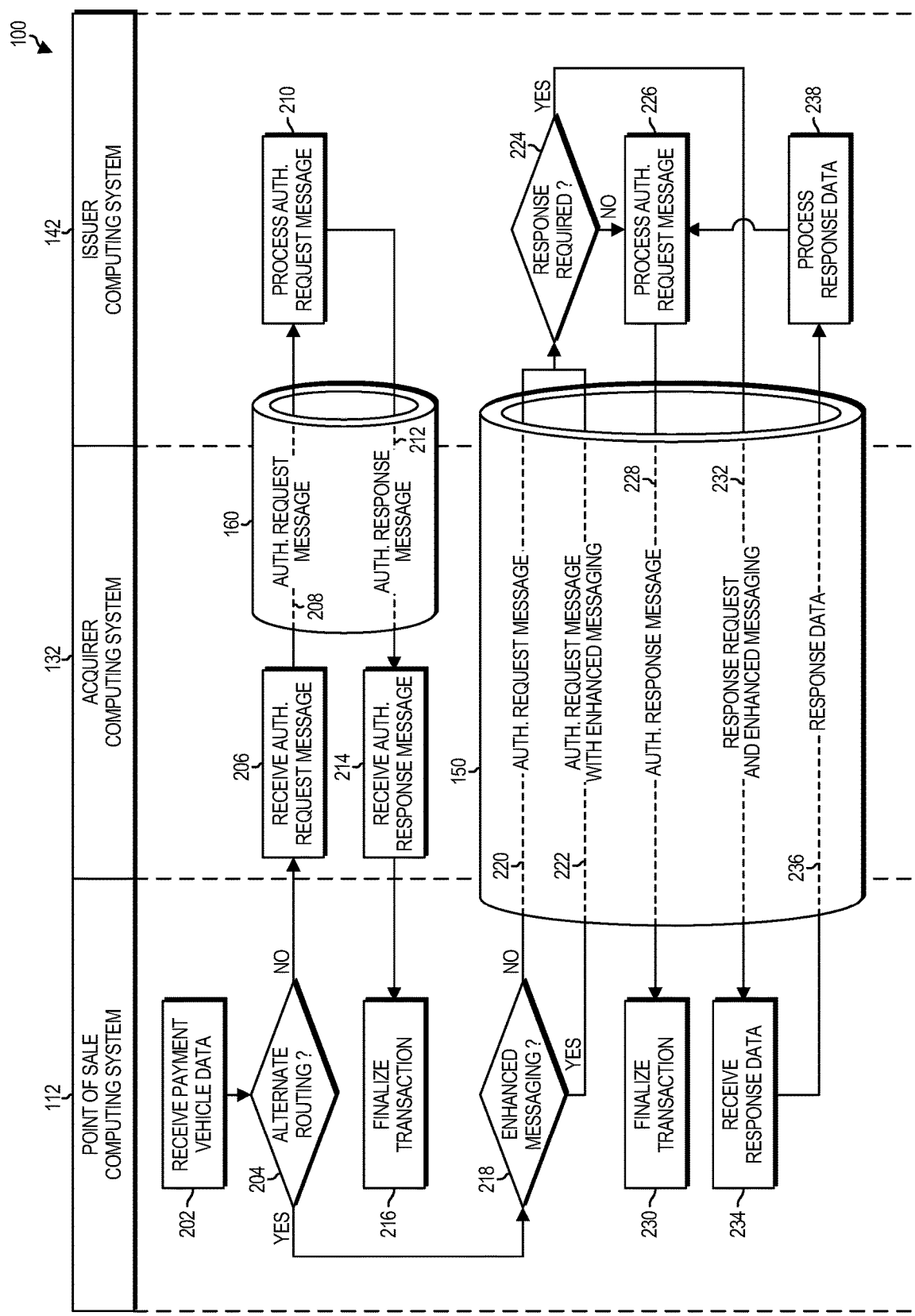
FIG. 2 is a simplified messaging and processing flow diagram of at least one embodiment of the system of FIG. 1 for providing enhanced credit transaction functionality.

Referring now to FIG. 2, a simplified messaging and processing flow diagram of the system 100 for providing enhanced credit processing and messaging is depicted. At block 202, the POS computing system 112 of the merchant 110 receives payment vehicle data corresponding to a payment vehicle 104 tendered by the consumer 102 for a credit or payment transaction. The credit transaction can be associated with the purchase of goods or services (e.g., a purchase event) from the merchant 110.

At decision block 204, the POS computing system 112 determines whether the credit transaction is an alternate routing candidate. For example, the POS computing system 112 determines whether messaging and processing for the credit transaction should occur over the PIN debit network 150 or if messaging and processing should occur over the card network(s) 160. In the illustrative embodiment, the PIN debit network 150 is configured to communicate additional types of data that cannot be communicated via the card network(s) 160 due to strict financial transaction messaging specifications and protocols. If, in decision block 204, the POS computing system 112 determines that the credit transaction is an alternate routing candidate, processing advances to decision block 218. If, however, the POS computing system 112 instead determines that the credit transaction is not an alternate routing candidate, the POS computing system 112 transmits an authorization request message for the credit transaction to the acquirer computing system 132 of the acquirer 130 for transmission to the issuer computing system 142 via the card network(s) 160. Processing then advances to block 206.

In block 206, the acquirer computing system 132 receives the authorization request message transmitted by the POS computing system 112. Subsequently, in flow 208, the acquirer computing system 132 transmits and/or forwards the received authorization request message to the issuer computing system 142 via the card network(s) 160 according to traditional payment vehicle processing techniques and messaging. In block 210, upon receiving the authorization request message forwarded by the acquirer computing system 132, the issuer computing system 142 processes the received authorization request message. For example, the issuer computing system 142 can generate a corresponding authorization response message based at least in part on, or otherwise as a function of, the received authorization request message.

In flow 212, the issuer computing system 142 transmits the authorization response message to the acquirer computing system 132 via the card network(s) 160. Subsequently, in block 214, the acquirer computing system 132 receives the authorization response message transmitted by the issuer computing system 142. Upon receiving the authorization response message, the acquirer computing system 132 transmits and/or forwards the authorization response message to the POS computing system 112. In block 216, the POS computing system 112 finalizes the credit transaction corresponding to the purchase event based on the received authorization response message.

In decision block 218, in response to determining that the credit transaction is an alternate routing candidate, the POS computing system 112 determines whether enhanced and/or additional messaging is required for the credit transaction. That is, the POS computing system 112 can determine whether data and/or messaging in addition to the authorization request message should be transmitted to the issuer computing system 142. If, in decision block 218, the POS computing system 112 determines that enhanced and/or additional messaging is not required for the credit transaction, processing advances to flow 220 in which the POS computing system 112 transmits only the authorization request message directly to the issuer computing system 142 via the PIN debit network 150. If, however, the POS computing system 112 determines instead that enhanced and/or additional messaging is required for the credit transaction, processing advances to flow 222 in which the POS computing system 112 transmits the authorization request message and any additional messaging directly to the issuer computing system 142 via the PIN debit network 150. In either case, processing advances to decision block 224.

In decision block 224, the issuer computing system 142 determines whether a response from the consumer 102 is required to complete the credit transaction or for any other purpose. For example, in some embodiments, the issuer computing system 142 can determine that a response from the consumer 102 can be required to accept an offer associated with the credit transaction and/or a credit account of the consumer 102. If, in decision block 224, the issuer computing system 142 determines that a response from the consumer 102 is not required, processing advances to block 226.

In block 226, the issuer computing system 142 processes the authorization request message. To do so, in some embodiments, the issuer computing system 142 generates an authorization response message based at least in part on, or otherwise as a function of, the authorization request message received directly from the POS computing system 112. Subsequently, in flow 228, the issuer computing system 142 transmits the authorization response message directly to the POS computing system 112 via the PIN debit network 150. Next, in block 230, the POS computing system 112 finalizes the credit transaction corresponding to the purchase event based on the received authorization response message.

Returning to decision block 224, if the issuer computing system 142 determines instead that a response from the consumer 102 is required, processing advances to flow 232 in which the issuer computing system 142 transmits a response request message directly to the POS computing system 112 via the PIN debit network 150. Subsequently, in block 234, the POS computing system 112 receives response data from the consumer 102. As discussed, the response request message can be configured to elicit response data from the consumer 102.

After receiving the response data from the consumer 102, the POS computing system 112, in flow 236, transmits the response data directly to the issuer computing system 142 via the PIN debit network 150. In block 238, upon receipt of the response data from the POS computing system 112, the issuer computing system 142 processes the received response data. The process advances to block 226 in which the issuer computing system 142 processes the authorization request message based on the authorization request message initially received directly from the POS computing system 112 and the processed response data. To do so, in some embodiments, the issuer computing system 142 generates a corresponding authorization response message that can be transmitted to the POS computing system 112 via the PIN debit network 150 as discussed above.

Figure 3:
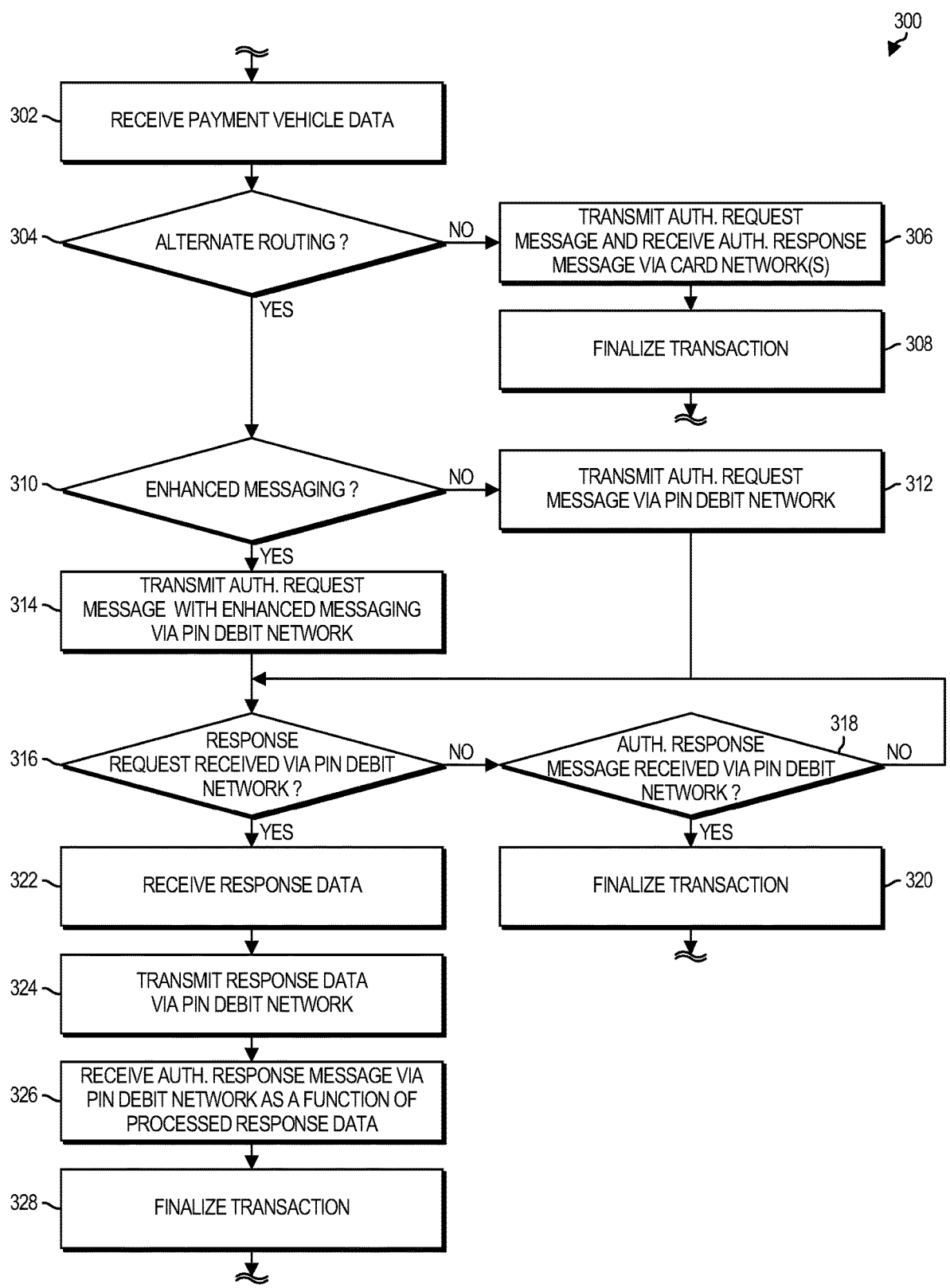
FIG. 3 is a simplified flow diagram of at least one embodiment of a method that may be executed by the point of sale computing system of FIGS. 1 and 2 for leveraging a PIN debit network to provide enhanced credit processing and messaging.

Referring now to FIG. 3, a method 300 that may be executed by the POS computing system 112 of the merchant 110 for leveraging the PIN debit network 150 to provide enhanced credit processing and messaging begins with block 302. In block 302, the POS computing system 112 receives payment vehicle data corresponding to a payment vehicle 104 tendered by the consumer 102 for a credit transaction or payment transaction. The credit transaction can be associated with the purchase of goods or services (e.g., a purchase event). In some embodiments, the payment vehicle data can include a bank identification number (BIN) or other bank identifier associated with the payment vehicle 104 tendered in the credit transaction, an account identifier associated with the payment vehicle 104 tendered in the credit transaction, or any other type of data that communicates account information and/or information corresponding to the consumer 102.

In decision block 304, the POS computing system 112 determines whether the credit transaction is an alternate routing candidate. That is, the POS computing system 112 determines whether the credit transaction is to be routed to the issuer financial institution 140 via the card network(s) 160 using traditional credit processing techniques or whether the credit transaction, or a portion thereof, is to be routed to the issuer financial institution 140 via the PIN debit network 150. As discussed, the PIN debit network 150 can be configured to communicate additional types of data that cannot be communicated via the card network(s) 160 due to strict financial transaction messaging specifications and protocols. In some embodiments, the POS computing system 112 determines whether the credit transaction is an alternate routing candidate based on the BIN and/or account identifier associated with the payment vehicle 104 tendered for the credit transaction. Additionally or alternatively, the POS computing system 112 can determine whether the credit transaction is an alternate routing candidate based at least in part on, or otherwise as a function of, transaction interchange fees. For example, the POS computing system 112 can determine that the credit transaction is an alternate routing candidate based on determining that if routed via the PIN debit network 150, lower transaction interchange fees would be levied on the credit transaction. In another example, the POS computing system 112 can determine that the credit transaction is an alternate routing candidate based on determining that two-way communications are required between the issuer financial institution 140 and the consumer 102 to complete the credit or payment transaction. It should be appreciated that any other transaction parameters or characteristics can be utilized by the POS computing system 112 to determine whether the credit transaction is an alternate routing candidate. If, in decision block 304, the POS computing system 112 determines that the credit transaction is an alternate routing candidate, the method 300 advances to decision block 310. If, however, the POS computing system 112 instead determines that the credit transaction is not an alternate routing candidate, the method 300 advances to block 306.

In block 306, in response to determining that the credit transaction is not an alternate routing candidate, the POS computing system 112 transmits an authorization request message for the credit transaction to the acquirer computing system 132 of the acquirer 130. It should be appreciated that the authorization request message can be transmitted and/or forwarded by the acquirer computing system 132 to the issuer computing system 142 via the card network(s) 160 according to traditional payment vehicle processing techniques. Additionally, in block 306, the POS computing system 112 receives an authorization response message from the acquirer computing system 132. It should be appreciated that, in some embodiments, the authorization response message can first be received by the acquirer computing system 132 from the issuer computing system 142 via the card network(s) 160 according to traditional payment vehicle processing techniques. In such embodiments, the acquirer computing system 132 can transmit and/or forward the authorization response message to the POS computing system 112.

In block 308, the POS computing system 112 can finalize the credit transaction corresponding to the purchase event based on the received authorization response message. For example, the POS computing system 112 can generate a receipt for the credit transaction and/or the purchase event based at least in part on, or otherwise as a function of, the received authorization response message. In other examples, the POS computing system 112 can facilitate the settlement of funds associated with the credit transaction based on the received authorization response message. It should be appreciated that the POS computing system 112 can perform any other transaction finalization processing based on the received authorization response message.

In decision block 310, in response to determining that the credit transaction is an alternate routing candidate, the POS computing system 112 determines whether enhanced and/or additional messaging is required for the credit transaction. That is, the POS computing system 112 can determine whether data and/or messaging in addition to the authorization request message should be transmitted to the issuer computing system 142 via the PIN debit network 150. For example, in some embodiments, the POS computing system 112 can determine whether application data for a new credit account requested by the consumer 102 should be transmitted to the issuer computing system 142 via the PIN debit network 150. In another example, the POS computing system 112 can determine whether credit line increase request data should be transmitted to the issuer computing system 142 via the PIN debit network 150. It should be appreciated that the POS computing system 112 can determine whether any other type of data or information should be transmitted to the issuer computing system 142 via the PIN debit network 150. If, in decision block 310, the POS computing system 112 determines that enhanced and/or additional messaging is not required for the credit transaction, the method 300 advances to block 312 in which the POS computing system 112 transmits only the authorization request message directly to the issuer computing system 142 via the PIN debit network 150. The method 300 then advances to decision block 316. If, however, the POS computing system 112 determines instead that enhanced and/or additional messaging is required for the credit transaction, the method 300 advances to block 314 in which the POS computing system 112 transmits the authorization request message and any additional messaging or data directly to the issuer computing system 142 via the PIN debit network 150.

In decision block 316, the POS computing system 112 determines whether a response request message is received from the issuer computing system 142. The response request message can include a request for response data from the consumer 102 and can be received via the PIN debit network 150. As discussed below, the POS computing system 112 can elicit a response from the consumer 102 based on the response request message. For example, in some embodiments, the response request message can include a financing offer from the issuer financial institution 140 (or a third party promotion entity) for the credit transaction. The financing offer (including the offered terms) can be presented to the consumer 102 via the POS computing system 112 and a response can be elicited. In other examples, the response request message can include an offer for a new credit account or an offer to increase the credit limit of an existing credit account. Of course, the response request message can include any other type of data or offer for eliciting a response from the consumer 102. It should be appreciated that such types of bi-directional communications are not possible over the card network(s) 160 due to the strict financial transaction messaging specifications and protocols employed. If, in decision block 316, the POS computing system 112 determines that a response request message is not received from the issuer computing system 142 via the PIN debit network 150, the method 300 advances to decision block 318. If, however, the POS computing system 112 determines instead that a response request message is received from the issuer computing system 142 via the PIN debit network 150, the method 300 advances to block 322.

In decision block 318, in response to determining that a response request message is not received from the issuer computing system 142 via the PIN debit network 150, the POS computing system 112 determines whether an authorization response message is received directly from the issuer computing system 142 via the PIN debit network 150. The authorization response message can be based on the authorization request message initially transmitted from the POS computing system 112 in block 312 or block 314. If, in decision block 318, the POS computing system 112 determines that an authorization response message is not received from the issuer computing system 142, the method 300 loops back to decision block 316 and the POS computing system 112 determines whether a response request message is received from the issuer computing system 142 via the PIN debit network 150. If, however, in decision block 318, the POS computing system 112 determines instead that an authorization response message is received from the issuer computing system 142 via the PIN debit network 150, the method 300 advances to block 320 in which the POS computing system 112 finalizes the credit transaction corresponding to the purchase event based on the received authorization response message.

In block 322, in response to determining that a response request message is received from the issuer computing system 142 via the PIN debit network 150 in decision block 316, the POS computing system 112 receives response data from the consumer 102. As discussed above, the POS computing system 112 can elicit response data from the consumer 102 based at least in part on, or otherwise a function of, the response request message received from the issuer computing system 142 via the PIN debit network 150. For example, in embodiments in which the response request message received from the issuer computing system 142 includes a financing offer for the credit transaction, the POS computing system 112 can elicit an acceptance and any related information from the consumer 102 for the financing offer. It should be appreciated that the POS computing system 112 can elicit and receive any other type of response data from the consumer 102 as a function of the response request message received from the issuer computing system 142.

In block 324, the POS computing system 112 can transmit the response data received from the consumer 102 to the issuer computing system 142 via the PIN debit network 150. Subsequently, in block 326, the POS computing system 112 can receive an authorization response message directly from the issuer computing system 142 via the PIN debit network 150. The authorization response message can be based on the authorization request message initially transmitted by the POS computing system 112 in block 312 or block 314 and the response data transmitted by the POS computing system 112 in block 324. In block 328, after receiving the authorization response message from the issuer computing system 142, the POS computing system 112 finalizes the credit transaction corresponding to the purchase event based on the received authorization response message.

Figure 4:
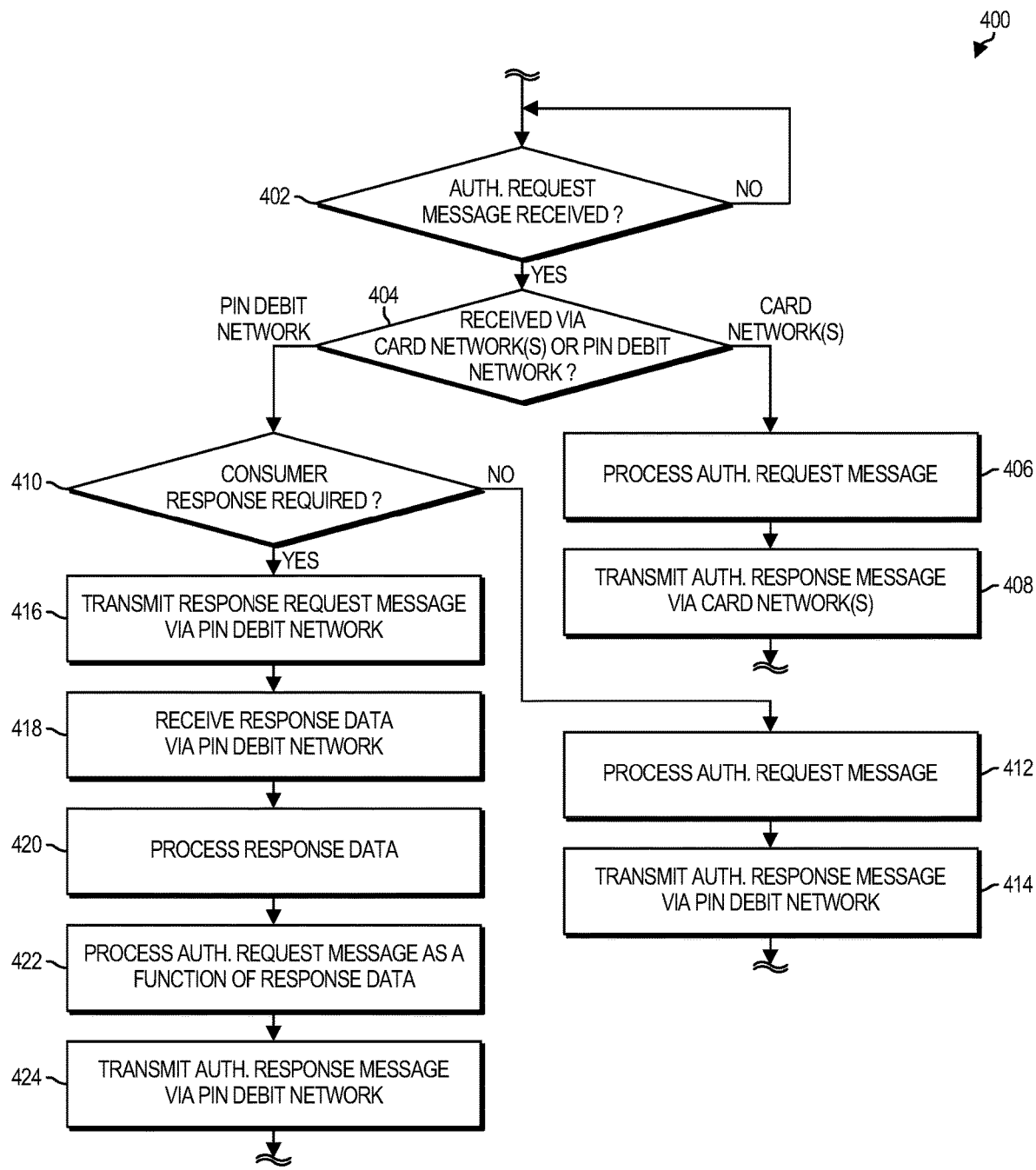
FIG. 4 is a simplified flow diagram of at least one embodiment of a method that may be executed by the issuer computing system of FIGS. 1 and 2 for leveraging a PIN debit network to provide enhanced credit processing and messaging.

Referring now to FIG. 4, a method 400 that may be executed by the issuer computing system 142 of the issuer financial institution 140 for leveraging the PIN debit network 150 to provide enhanced credit processing and messaging begins with decision block 402. In decision block 402, the issuer computing system 142 determines whether an authorization request message is received from the POS computing system 112 (or an intermediary device such as the acquirer computing system 132). The authorization request message corresponds to a credit transaction or payment transaction for a purchase event. If, in decision block 402, the issuer computing system 142 determines that an authorization request message is received from the POS computing system 112, the method 400 advances to decision block 404. If, however, the issuer computing system 142 determines instead that an authorization request message is not received from the POS computing system 112, the method 400 loops back to decision block 402 and the issuer computing system 142 continues monitoring for receipt of an authorization request message from the POS computing system 112 (or an intermediary device).

In decision block 404, the issuer computing system 142 determines whether the authorization request message was received from the POS computing system 112 via the card network(s) 160 or via the PIN debit network 150. As discussed, in some embodiments, the authorization request message can be received via the POS computing system 112 via the card network(s) 160 using traditional credit processing techniques. In such embodiments, the authorization request message can first be received by the acquirer computing system 132 (or another intermediary device) and then forwarded over the card network(s) 160 to the issuer computing system 142 according to traditional credit processing messaging and processing. In other embodiments, the authorization request message can be received directly from the POS computing system 112 via the PIN debit network 150. If, in decision block 404, the issuer computing system 142 determines that the authorization request message is received from the POS computing system via the card network(s) 160 (and any intermediary computing systems), the method 400 advances to block 406. If, however, the issuer computing system 142 determines instead that the authorization request message is received directly from the POS computing system 112 via the PIN debit network 150, the method 400 advances to decision block 410.

In block 406, in response to determining that the authorization request message is received via the card network(s) 160, the issuer computing system 142 processes the authorization request message according to traditional credit processing techniques. For example, the issuer computing system 142 can generate an authorization response message based at least in part on, or otherwise as a function of, the received authorization request message. Subsequently, in block 408, the issuer computing system 142 transmits the authorization response message to the POS computing system 112 via the card network(s) 160 (and any intermediary computing devices) according to traditional credit processing techniques and messaging protocols.

In decision block 410, in response to determining that the authorization request message is received via the PIN debit network 150, the issuer computing system 142 determines whether a consumer response is required. In some embodiments, the consumer response can be required to complete the credit transaction. In other embodiments, the consumer response can be an offer for additional services, an offer for a new credit account, a request for acceptance of new and/or modified account terms and conditions, an offer to increase a credit limit, a balance transfer offer, a request for acknowledgement of applicable interest rates or fees, a discount offer, or any other type of offer and/or communication requiring a response from the consumer 102. If, in decision block 410, the issuer computing system 142 determines that a response from the consumer 102 is required, the method 400 advances to block 416. If, however, the issuer computing system 142 determines instead that a response from the consumer 102 is not required, the method 400 advances to block 412.

In block 412, in response to determining that a response from the consumer 102 is not required, the issuer computing system 142 processes the authorization request message. To do so, in some embodiments, the issuer computing system 142 generates an authorization response message based at least in part on, or otherwise as a function of, the authorization request message received in block 402. Subsequently, in block 414, the issuer computing system 142 transmits the authorization response message to the POS computing system 112 via the PIN debit network 150.

In block 416, in response to determining that a response from the consumer 102 is required, the issuer computing system 142 transmits a response request message to the POS computing system 112 via the PIN debit network 150. The response request message can include a request for response data from the consumer 102. As discussed, in some embodiments, the response request message can include an interactive offer to be presented to the consumer 102 via the POS computing system 112. It should be appreciated that such types of bi-directional communications and requests are not possible over the card network(s) 160 due to the strict financial transaction messaging specifications and protocols employed.

In block 418, the issuer computing system 142 receives response data from the POS computing system 112 via the PIN debit network 150. The received response data can be based on the response request message transmitted to the POS computing system 112 in block 416. Subsequently, in block 420, the issuer computing system 142 processes the received response data. For example, in some embodiments, the issuer computing system 142 can determine whether the consumer 102 accepted a financing offer for the credit transaction, accepted an offer for increasing the consumer's 102 credit limit, accepted or requested a balance transfer, and/or accepted or requested any other type of offer or service.

In block 422, the issuer computing system 142 processes the authorization request message based on the authorization request message initially received from the POS computing system 112 in block 402 and the response data received from the POS computing system 112 in block 418 and processed by the issuer computing system 142 in block 420. To do so, in some embodiments, the issuer computing system 142 generates a corresponding authorization response message. Subsequently, in block 424, the issuer computing system 142 transmits the authorization response message to the POS computing system 112 via the PIN debit network 150 for finalization of the credit/payment transaction.

Figure 5:
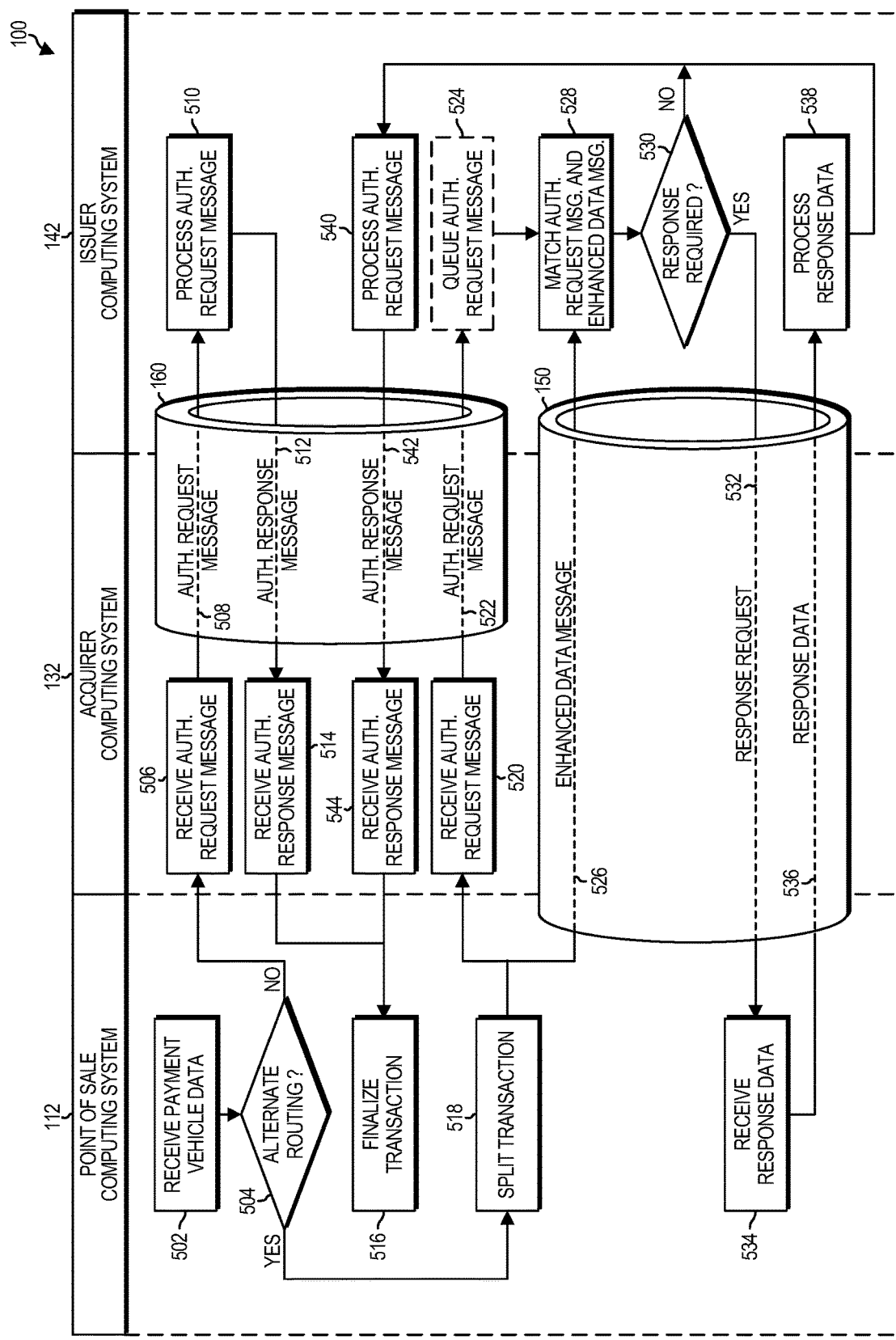
FIG. 5 is a simplified messaging and processing flow diagram of at least one other embodiment of the system of FIG. 1 for providing enhanced credit transaction functionality.

Referring now to FIG. 5, an alternative simplified messaging and processing flow diagram of the system 100 for providing enhanced credit processing and messaging is depicted. At block 502, the POS computing system 112 of the merchant 110 receives payment vehicle data corresponding to a payment vehicle 104 tendered by the consumer 102 for a credit or payment transaction. The credit transaction can be associated with the purchase of goods or services (e.g., a purchase event) from the merchant 110.

At decision block 504, the POS computing system 112 determines whether the credit transaction is an alternate routing candidate. For example, the POS computing system 112 determines whether all or a portion of messaging and processing for the credit transaction should occur over the PIN debit network 150 or if all or a portion of messaging and processing should occur over the card network(s) 160. In embodiments such as the one illustratively shown in FIG. 5, the PIN debit network 150 can be configured to communicate additional types of data that cannot be communicated via the card network(s) 160 due to strict financial transaction messaging specifications and protocols. In such embodiments, the POS computing system 112 can determine whether the credit transaction is an alternate routing candidate based on whether special or enhanced data is to be communicated between the POS computing system 112 and the issuer computing system 142 as part of the credit transaction. Such special or enhanced data can include data or information in addition to conventional credit processing data or messages (e.g., authorization request messages, authorization response messages, etc.). For example, the special or enhanced data can be embodied as a loyalty account identifier associated with the consumer 102, SKU data corresponding to purchased products or services, promotional offer data, financing offer data, payment card application data, credit line increase data, and/or any other type of data that cannot be communicated over traditional payment card networks 160 due to strict financial transaction messaging specifications (e.g., ISO 8583, etc.) and/or protocol requirements employed. If, in decision block 504, the POS computing system 112 determines that the credit transaction is not an alternate routing candidate, the POS computing system 112 transmits an authorization request message for the credit transaction to the acquirer computing system 132 of the acquirer 130 for transmission to the issuer computing system 142 via the card network(s) 160. Processing then advances to block 506.

In block 506, the acquirer computing system 132 receives the authorization request message transmitted by the POS computing system 112. Subsequently, in flow 508, the acquirer computing system 132 transmits and/or forwards the received authorization request message to the issuer computing system 142 via the card network(s) 160 according to traditional payment vehicle processing techniques and messaging. In block 510, upon receiving the authorization request message forwarded by the acquirer computing system 132, the issuer computing system 142 processes the received authorization request message. For example, the issuer computing system 142 can generate a corresponding authorization response message based at least in part on, or otherwise as a function of, the received authorization request message.

In flow 512, the issuer computing system 142 transmits the authorization response message to the acquirer computing system 132 via the card network(s) 160. Subsequently, in block 514, the acquirer computing system 132 receives the authorization response message transmitted by the issuer computing system 142. Upon receiving the authorization response message, the acquirer computing system 132 transmits and/or forwards the authorization response message to the POS computing system 112. In block 516, the POS computing system 112 finalizes the credit transaction corresponding to the purchase event based on the received authorization response message.

Referring back to decision block 504, if the POS computing system 112 determines instead that the credit transaction is an alternate routing candidate, processing advances to block 518. In block 518, the POS computing system 112 splits the credit transaction into two or more messages. For example, in the illustrative embodiment, the POS computing system 112 splits the credit transaction into an authorization request message and an enhanced data message. The authorization request message can be formatted according to conventional financial transaction messaging specifications (e.g., ISO 8583, etc.) and/or protocols for transmission via the card network(s) 160. The enhanced data message can include one or more additional types of credit transaction data (e.g., special or enhanced data message) that cannot be communicated via the card network(s) 160, as discussed above.

Additionally, in block 518, after splitting the credit transaction, the POS computing system 112 transmits the authorization request message for the credit transaction to the acquirer computing system 132 of the acquirer 130 for transmission to the issuer computing system 142 via the card network(s) 160. Processing then advances to block 520 in which the acquirer computing system 132 receives the authorization request message transmitted by the POS computing system 112. Subsequently, in flow 522, the acquirer computing system 132 transmits and/or forwards the received authorization request message to the issuer computing system 142 via the card network(s) 160 according to traditional payment vehicle processing techniques and messaging. In some embodiments, in block 524, upon receiving the authorization request message forwarded by the acquirer computing system 132, the issuer computing system 142 queues the received authorization request message for subsequent processing.

Contemporaneously with, or at substantially the same time as, the authorization request message for the credit transaction is transmitted to acquirer computing system 132, the POS computing system 112, in flow 526, transmits the enhanced data message to the issuer computing system 142 via the PIN debit network 150. It should be appreciated that although the authorization request message and the enhanced data message are transmitted in parallel in the illustrative embodiment, the authorization request message and the enhanced data message can be transmitted at different times, in other embodiments. For example, in some embodiments, the POS computing system 112 can transmit the authorization request message to the issuer computing system 142 via the acquirer computing system 132 and card network(s) 160 prior to transmitting the enhanced data message to the issuer computing system 142 via the PIN debit network 150. In such embodiments and as discussed above, the issuer computing system 142 can be configured to queue the received authorization request message until the enhanced data message is received (block 524).

In block 528, the issuer computing system 142 matches the authorization request message received via the card network(s) 160 to the enhanced data message received via the PIN debit network 150. To do so, in some embodiments, the enhanced data message can include an identifier that matches a unique identifier of the authorization request message. For example, the enhanced data message can include an identifier that matches a unique transaction identifier included in the authorization request message. It should be appreciated, however, that the enhanced data message and the authorization request message can include any other type of data or keys capable of being matched by the issuer computing system 142.

Subsequently, in decision block 530, the issuer computing system 142 determines whether a response from the consumer 102 is required to complete the credit transaction or for any other purpose. For example, in some embodiments, the issuer computing system 142 can determine that a response to an offer provided to the consumer 102 is required. If, in decision block 530, the issuer computing system 142 determines that a response from the consumer 102 is not required, processing advances to block 540.

In block 540, the issuer computing system 142 processes the authorization request message based at least in part on, or otherwise as a function of, the enhanced data message matched thereto. To do so, in some embodiments, the issuer computing system 142 generates an authorization response message based at least in part on the authorization request message received from the POS computing system 112 via the card network(s) 160 and the matching enhanced data message received from the POS computing system 112 via the PIN debit network 150. Subsequently, in flow 542, the issuer computing system 142 transmits the generated authorization response message to the acquirer computing system 132 via the card network(s) 160. In block 544, the acquirer computing system 132 receives the authorization response message transmitted by the issuer computing system 142. Upon receiving the authorization response message, the acquirer computing system 132 transmits and/or forwards the authorization response message to the POS computing system 112. Processing then advances to block 516 in which the POS computing system 112 finalizes the credit transaction corresponding to the purchase event based on the received authorization response message.

Returning to decision block 530, if the issuer computing system 142 determines instead that a response from the consumer 102 is required, processing advances to flow 532 in which the issuer computing system 142 transmits a response request message directly to the POS computing system 112 via the PIN debit network 150. Subsequently, in block 534, the POS computing system 112 receives response data from the consumer 102. As discussed, the response request message can be configured to elicit response data from the consumer 102.

After receiving the response data from the consumer 102, the POS computing system 112, in flow 536, transmits the response data directly to the issuer computing system 142 via the PIN debit network 150. In block 538, upon receipt of the response data from the POS computing system 112, the issuer computing system 142 processes the received response data. The process advances to block 540 in which the issuer computing system 142 processes the authorization request message based at least in part on, or otherwise as a function of, the matching enhanced data message and the processed response data. To do so, in some embodiments, the issuer computing system 142 generates a corresponding authorization response message. Processing advances to flow 542, block 544, and block 516 in which the issuer computing system 142 transmits the generated authorization response message to the acquirer computing system 132 via the card network(s) 160, the acquirer computing system 132 transmits and/or forwards the authorization response message to the POS computing system 112, and the POS computing system 112 finalizes the credit transaction corresponding to the purchase event based on the received authorization response message.

Figure 6:
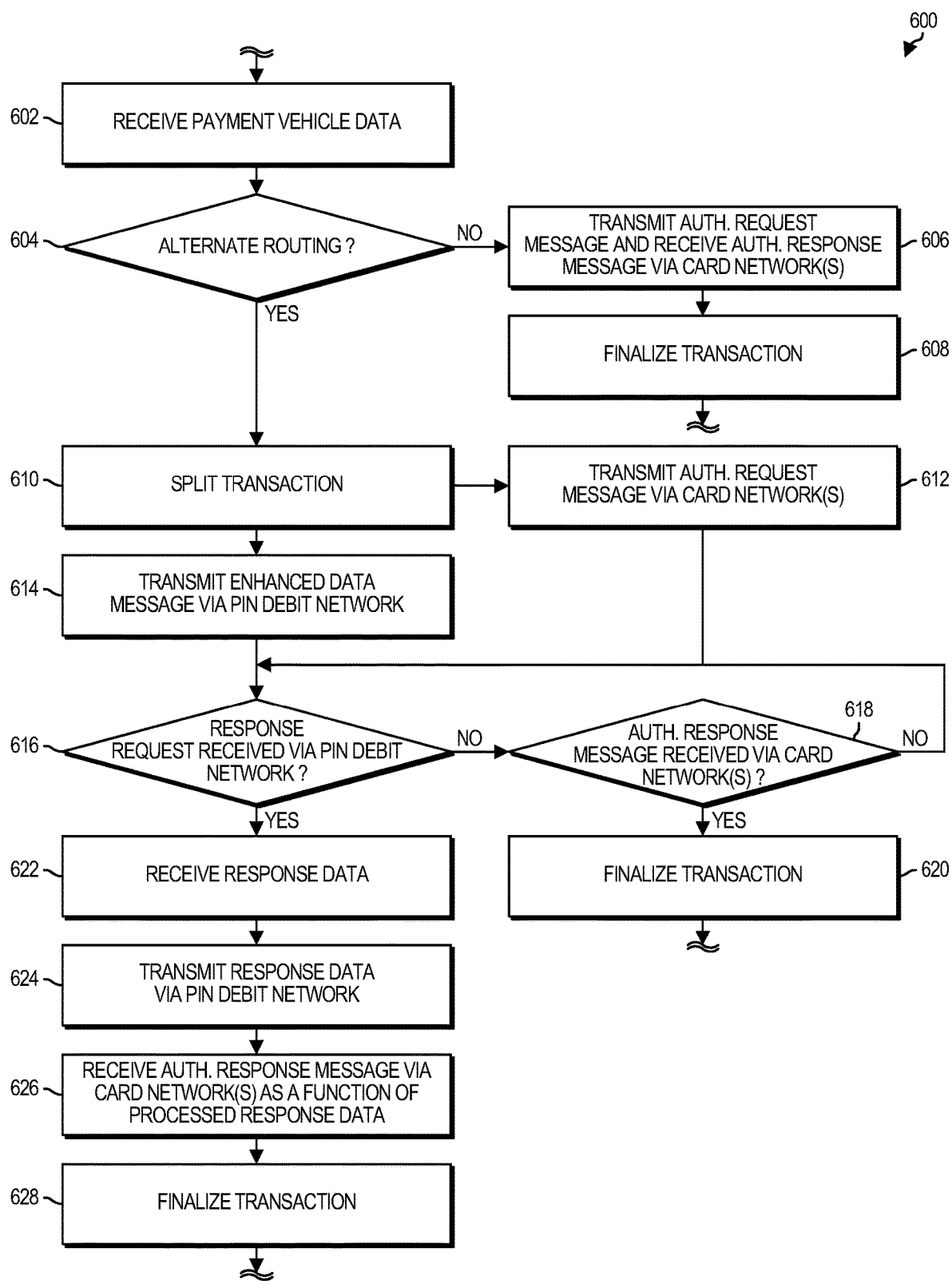
FIG. 6 is a simplified flow diagram of at least one other embodiment of a method that may be executed by the point of sale computing system of FIGS. 1 and 5 for leveraging a PIN debit network and a card network to provide enhanced credit processing and messaging.

Referring now to FIG. 6, a method 600 that may be executed by the POS computing system 112 of the merchant 110 for leveraging the PIN debit network 150 and the card network(s) 160 to provide enhanced credit processing and messaging begins with block 602. In block 602, the POS computing system 112 receives payment vehicle data corresponding to a payment vehicle 104 tendered by the consumer 102 for a credit transaction or payment transaction. The credit transaction can be associated with the purchase of goods or services (e.g., a purchase event). In some embodiments, the payment vehicle data can include a bank identification number (BIN) or other bank identifier associated with the payment vehicle 104 tendered in the credit transaction, an account identifier associated with the payment vehicle 104 tendered in the credit transaction, or any other type of data that communicates account information and/or information corresponding to the consumer 102.

In decision block 604, the POS computing system 112 determines whether the credit transaction is an alternate routing candidate. That is, the POS computing system 112 determines whether the credit transaction, or a portion thereof, is to be routed to the issuer financial institution 140 via the card network(s) 160 using traditional credit processing techniques or whether the credit transaction, or a portion thereof, is to be routed to the issuer financial institution 140 via the PIN debit network 150. As discussed, the PIN debit network 150 can be configured to communicate additional types of data that cannot be communicated via the card network(s) 160 due to the strict financial transaction messaging specifications and protocols employed. In some embodiments, the POS computing system 112 determines whether the credit transaction is an alternate routing candidate based on the BIN and/or account identifier associated with the payment vehicle 104 tendered for the credit transaction. Additionally or alternatively, the POS computing system 112 can determine that the credit transaction is an alternate routing candidate based on determining that two-way communications are required between the issuer financial institution 140 and the consumer 102 to complete the credit or payment transaction.

In some embodiments, the POS computing system 112 can also determine whether the credit transaction is an alternate routing candidate based on whether a special or enhanced data message is to be communicated between the POS computing system 112 and the issuer computing system 142 as part of the credit transaction. Such special or enhanced data message can include data or information in addition to conventional credit processing data or messages (e.g., authorization request messages, authorization response messages, etc.). For example, the special or enhanced data message can be embodied as or include a loyalty account identifier associated with the consumer 102, SKU data corresponding to purchased products or services, promotional offer data, financing offer data, payment card application data, credit line increase data, and/or any other type of data that cannot be communicated over traditional payment card networks 160 due to the strict financial transaction messaging specifications (e.g., ISO 8583, etc.) and/or protocol requirements employed. It should be appreciated that any other transaction parameters or characteristics can be utilized by the POS computing system 112 to determine whether the credit transaction is an alternate routing candidate. If, in decision block 604, the POS computing system 112 determines that the credit transaction is not an alternate routing candidate, the method 600 advances to block 606.

In block 606, in response to determining that the credit transaction is not an alternate routing candidate, the POS computing system 112 transmits an authorization request message for the credit transaction to the acquirer computing system 132 of the acquirer 130. It should be appreciated that the authorization request message can be transmitted and/or forwarded by the acquirer computing system 132 to the issuer computing system 142 via the card network(s) 160 according to traditional payment vehicle processing techniques. Additionally, in block 606, the POS computing system 112 receives an authorization response message from the acquirer computing system 132. It should be appreciated that, in some embodiments, the authorization response message can first be received by the acquirer computing system 132 from the issuer computing system 142 via the card network(s) 160 according to traditional payment vehicle processing techniques. In such embodiments, the acquirer computing system 132 can transmit and/or forward the authorization response message to the POS computing system 112.

In block 608, the POS computing system 112 finalizes the credit transaction corresponding to the purchase event based on the received authorization response message. For example, the POS computing system 112 can generate a receipt for the credit transaction and/or the purchase event based at least in part on, or otherwise as a function of, the received authorization response message. In other examples, the POS computing system 112 can facilitate the settlement of funds associated with the credit transaction based on the received authorization response message. It should be appreciated that the POS computing system 112 can perform any other transaction finalization processing based on the received authorization response message.

Referring back to decision block 604, if the POS computing system 112 determines instead that the credit transaction is an alternate routing candidate, processing advances to block 610. In block 610, the POS computing system 112 splits the credit transaction into two or more messages. For example, in the illustrative embodiment, the POS computing system 112 splits the credit transaction into an authorization request message and an enhanced data message. The authorization request message can be formatted according to conventional financial transaction messaging specifications (e.g., ISO 8583, etc.) and/or protocols for transmission via the card network(s) 160. The enhanced data message can include one or more additional types of credit transaction data that cannot be communicated via the card network(s) 160, as discussed above. The method 600 then advances in parallel to blocks 612 and 614. It should be appreciated that in some embodiments, the method 600 advances first to block 612, advances first to block 614, or advances to block 612 contemporaneously with, or at substantially the same time as, advancing to block 614.

In block 612, the POS computing system 112 transmits the authorization request message for the credit transaction to the issuer computing system 142 via the acquirer computing system 132 and the card network(s) 160 according to traditional payment vehicle processing techniques. In block 614, the POS computing system 112 transmits the enhanced data message to the issuer computing system 142 via the PIN debit network 150. In embodiments in which the POS computing system 112 transmits the authorization request message to the issuer computing system 142 prior to transmitting the enhanced data message, the issuer computing system 142 can be configured to queue the authorization request message until the enhanced data message is received from the POS computing system 112. After transmitting the authorization request message and the enhanced data message, the method 600 advances to decision block 616.

In decision block 616, the POS computing system 112 determines whether a response request message is received from the issuer computing system 142. The response request message can include a request for response data from the consumer 102 and can be received via the PIN debit network 150. As discussed below, the POS computing system 112 can elicit a response from the consumer 102 based on the response request message. For example, in some embodiments, the response request message can include a financing offer from the issuer financial institution 140 (or a third party promotion entity) for the credit transaction. The financing offer (including the offered terms) can be presented to the consumer 102 via the POS computing system 112 and a response can be elicited. In other examples, the response request message can include an offer for a new credit account or an offer to increase the credit limit of an existing credit account. Of course, the response request message can include any other type of data or offer for eliciting response(s) from the consumer 102. It should be appreciated that such types of bi-directional communications are not possible over the card network(s) 160 due to the strict financial transaction messaging specifications and protocols employed. If, in decision block 616, the POS computing system 112 determines that a response request message is not received from the issuer computing system 142 via the PIN debit network 150, the method 600 advances to decision block 618.

In decision block 618, in response to determining that a response request message is not received from the issuer computing system 142 via the PIN debit network 150, the POS computing system 112 determines whether an authorization response message is received from the issuer computing system 142 via the card network(s) 160. The authorization response message can be based on the authorization request message and the enhanced data message initially transmitted by the POS computing system 112 in block 612 and block 614. If, in decision block 618, the POS computing system 112 determines that an authorization response message is not received from the issuer computing system 142, the method 600 loops back to decision block 616 and the POS computing system 112 determines whether a response request message is received from the issuer computing system 142 via the PIN debit network 150. If, however, in decision block 618, the POS computing system 112 determines instead that an authorization response message is received from the issuer computing system 142 via the card network(s) 160, the method 600 advances to block 620 in which the POS computing system 112 finalizes the credit transaction corresponding to the purchase event based on the received authorization response message.

Referring back to decision block 616, if the POS computing system 112 determines instead that a response request message is received from the issuer computing system 142 via the PIN debit network 150, the method 600 advances to block 622. In block 622, the POS computing system 112 receives response data from the consumer 102. As discussed above, the POS computing system 112 can elicit response data from the consumer 102 based at least in part on, or otherwise a function of, the response request message received from the issuer computing system 142 via the PIN debit network 150. For example, in embodiments in which the response request message received from the issuer computing system 142 includes a financing offer for the credit transaction, the POS computing system 112 can elicit an acceptance and any related information from the consumer 102 for the financing offer. It should be appreciated that the POS computing system 112 can elicit and receive any other type of response data from the consumer 102 as a function of the response request message received from the issuer computing system 142.

In block 624, the POS computing system 112 transmits the response data received from the consumer 102 to the issuer computing system 142 via the PIN debit network 150. Subsequently, in block 626, the POS computing system 112 receives an authorization response message from the issuer computing system 142 via card network(s) 160. The authorization response message can be based on the authorization request message initially transmitted by the POS computing system 112 in block 612, the enhanced data message transmitted by the POS computing system 112 in block 614, and the response data transmitted by the POS computing system 112 in block 624. In block 628, after receiving the authorization response message from the issuer computing system 142, the POS computing system 112 finalizes the credit transaction corresponding to the purchase event based on the received authorization response message.

Figure 7:
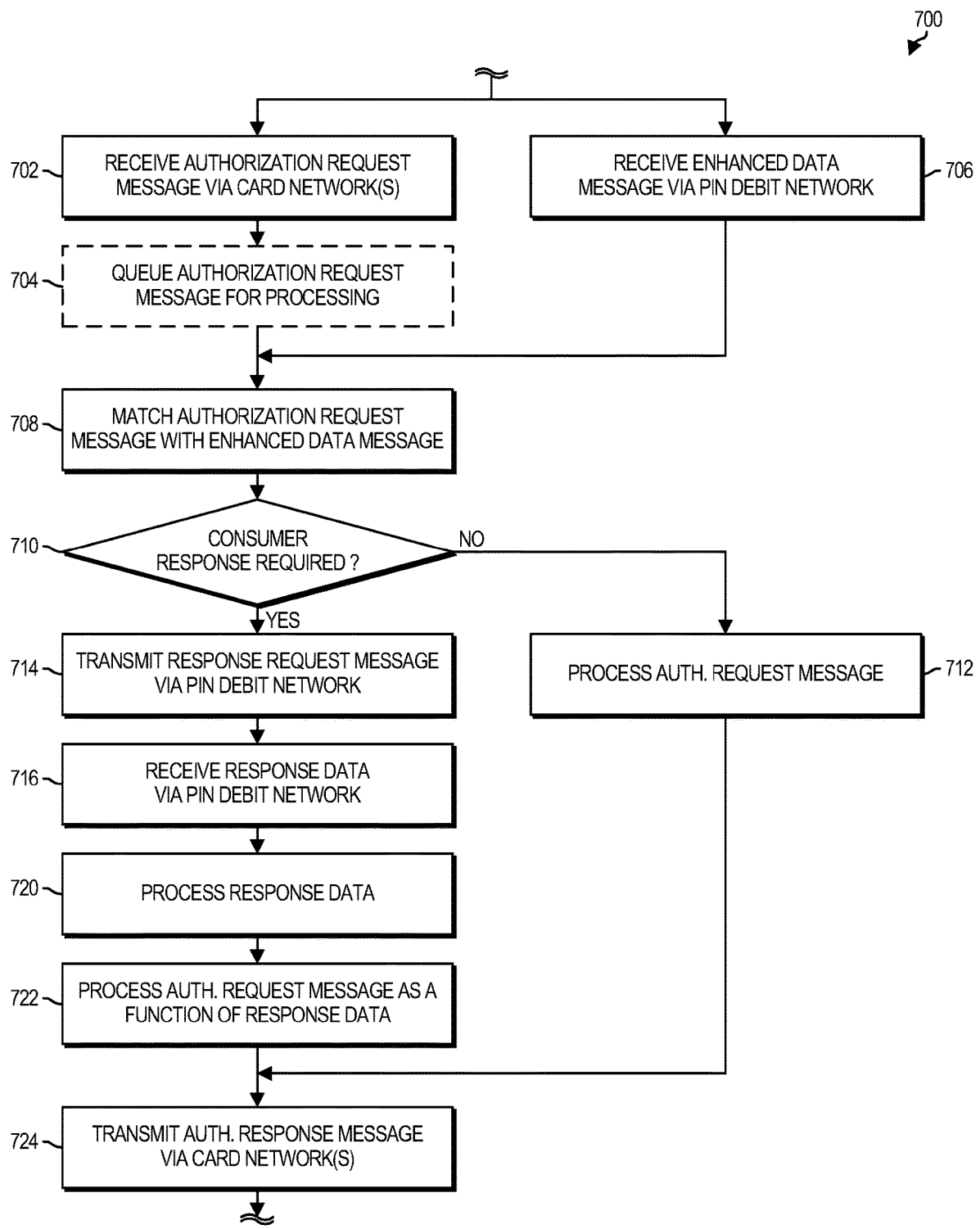
FIG. 7 is a simplified flow diagram of at least one embodiment of a method that may be executed by the issuer computing system of FIGS. 1 and 5 for leveraging a PIN debit network and a card network to provide enhanced credit processing and messaging.

Referring now to FIG. 7, a method 700 that may be executed by the issuer computing system 142 of the issuer financial institution 140 for leveraging the PIN debit network 150 and the card network(s) 160 to provide enhanced credit processing and messaging begins with block 702. In block 702, the issuer computing system 142 receives an authorization request message from the POS computing system 112 via the card network(s) 160 and any intermediary devices such, for example, the acquirer computing system 132. The authorization request message corresponds to a credit transaction or payment transaction for a purchase event.

Contemporaneously with, or at substantially the same time as, the authorization request message for the credit transaction is received from the POS computing system 112, the issuer computing system 142 receives, in block 706, an enhanced data message from the POS computing system 112 via the PIN debit network 150. It should be appreciated that although the authorization request message and the enhanced data message are received in parallel in the illustrative embodiment, the authorization request message and the enhanced data message can be received at different times, in other embodiments. For example, in some embodiments, the issuer computing system 142 can receive the authorization request message from the POS computing system 112 via the card network(s) 160 prior to receiving the enhanced data message from the POS computing system 112 via the PIN debit network 150. In such embodiments, in block 704, the issuer computing system 142 can be configured to queue the received authorization request message until the enhanced data message is received (block 706).

Subsequently, in block 708, the issuer computing system 142 matches the authorization request message received via the card network(s) 160 to the enhanced data message received via the PIN debit network 150. To do so, in some embodiments, the enhanced data message can include an identifier that matches a unique identifier of the authorization request message. For example, the enhanced data message can include an identifier that matches a unique transaction identifier included in the authorization request message. It should be appreciated, however, that the enhanced data message and the authorization request message can include any other type of data or keys capable of being matched by the issuer computing system 142.

In decision block 710, the issuer computing system 142 determines whether a response from the consumer 102 is required to complete the credit transaction or for any other purpose. For example, in some embodiments, the issuer computing system 142 can determine that a response to an offer provided to the consumer 102 is required. If, in decision block 710, the issuer computing system 142 determines that a response from the consumer 102 is not required, the method 700 advances to block 712.

In block 712, the issuer computing system 142 processes the authorization request message based at least in part on, or otherwise as a function of, the enhanced data message matched thereto. To do so, in some embodiments, the issuer computing system 142 generates an authorization response message based at least in part on the authorization request message received from the POS computing system 112 via the card network(s) 160 and the matching enhanced data message received from the POS computing system 112 via the PIN debit network 150. The method 700 advances to block 724 in which the issuer computing system 142 transmits the generated authorization response message to the POS computing system 112 via the card network(s) 160 and any intermediary devices (e.g., the acquirer computing system 132, etc.). The POS computing system 112 can then process and finalize the credit transaction based on the received authorization response message, as discussed above.

Referring back to decision block 710, if the issuer computing system 142 determines instead that a response from the consumer 102 is required, the method 700 advances to block 714 in which the issuer computing system 142 transmits a response request message directly to the POS computing system 112 via the PIN debit network 150. As discussed, the response request message can be configured to elicit response data from the consumer 102 via the POS computing system 112 (or a computing or input device associated therewith). Subsequently, in block 716, the issuer computing system 142 receives response data from the POS computing system 112 via the PIN debit network 150. In block 720, upon receipt of the response data from the POS computing system 112, the issuer computing system 142 processes the received response data. The method 700 then advances to block 722 in which the issuer computing system 142 processes the authorization request message based at least in part on, or otherwise as a function of, the matching enhanced data message and the processed response data. To do so, in some embodiments, the issuer computing system 142 generates a corresponding authorization response message. The method 700 advances to block 724 in which the issuer computing system 142 transmits the generated authorization response message to the POS computing system 112 via the card network(s) 160 and any intermediary devices (e.g., the acquirer computing system 132, etc.). The POS computing system 112 can then process and finalize the credit transaction based on the received authorization response message, as discussed above.

Figure 8:
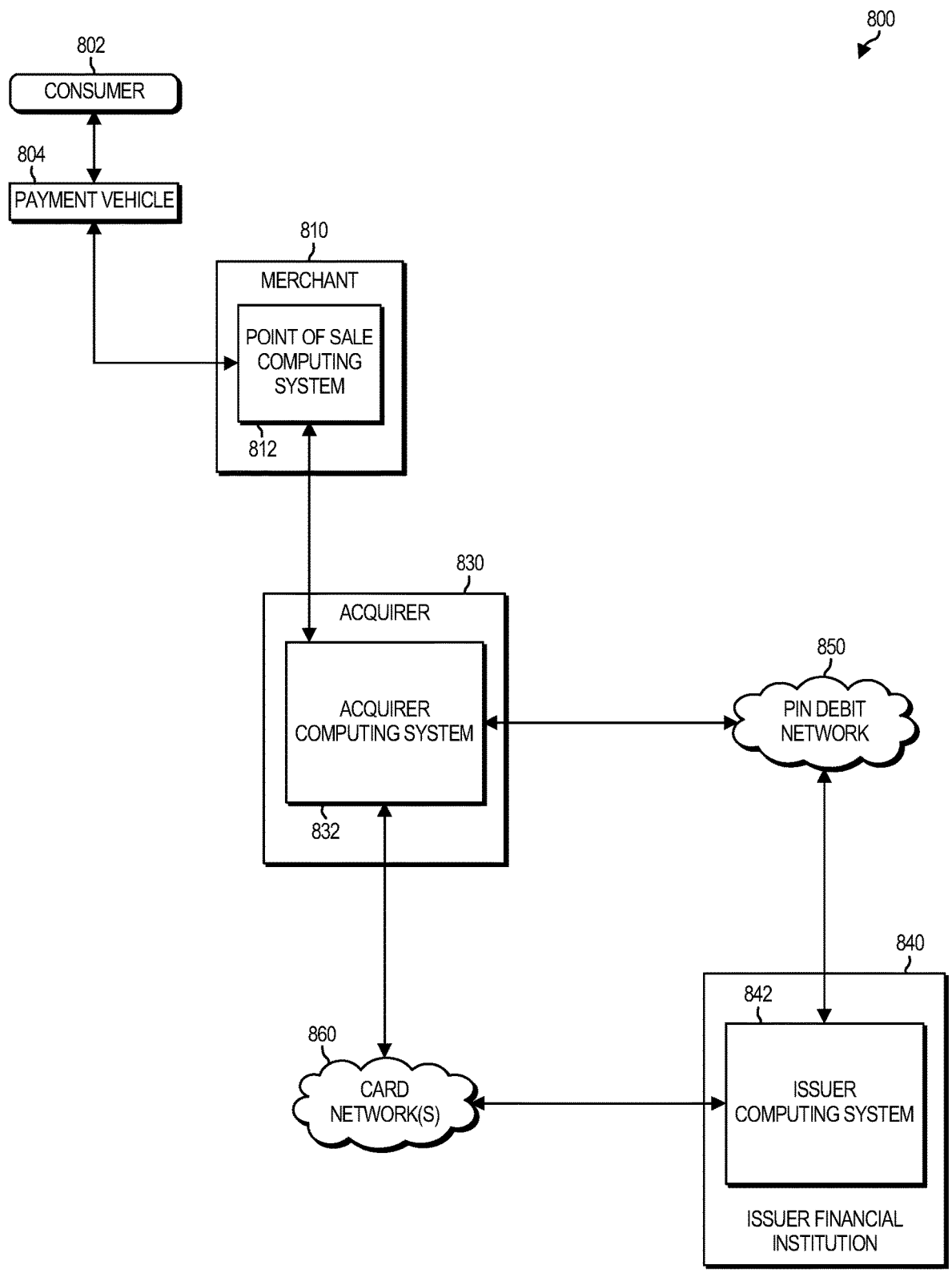
FIG. 8 is a simplified block diagram of at least one embodiment of a system for leveraging a PIN debit network and a card network to provide credit processing and messaging.

Referring now to FIG. 8, in one embodiment, a system 800 for providing credit processing and messaging includes a merchant 810, a merchant point of sale (POS) computing system 812, an acquirer 830, an acquirer computing system 832, an issuer financial institution 840, an issuer computing system 842, a PIN debit network 850, and one or more card networks 860. The system 800 can be embodied as an alternative arrangement to the system 100 illustratively shown in FIG. 1. As such, the merchant 810, merchant POS computing system 812, acquirer 830, acquirer computing system 832, issuer financial institution 840, issuer computing system 842, PIN debit network 850, and payment card network(s) 840 of the system 800 of FIG. 8 can be functionally or architecturally similar to, or the same as, in many respects to the merchant 110, merchant POS computing system 112, acquirer 130, acquirer computing system 132, issuer financial institution 140, issuer computing system 142, PIN debit network 150, and payment card network(s) 160 of the system 100 of FIG. 1. Additionally, the consumer 802 and payment vehicle 804 illustratively shown in FIG. 8 can be substantially similar to, or the same as, the consumer 102 and payment vehicle 104 illustratively shown in FIG. 1 and described above.

In some embodiments, the acquirer computing system 832 is configured to selectively transmit and/or route all or a portion of data and messaging associated with a credit transaction to the issuer computing system 842 via the card network(s) 860 and/or the PIN debit network 850. In such embodiments, the POS computing system 812 receives payment vehicle data associated with a payment vehicle 804 tendered by a consumer 802 for a credit transaction. The credit transaction can correspond to the purchase of goods or services (e.g., a purchase event) by the consumer 802. Upon receiving the payment vehicle data, the POS computing system 812 transmits transaction-specific data (e.g., a transaction amount, a BIN or other bank identifier associated with the payment vehicle 804 tendered in the credit transaction, an account identifier associated with the payment vehicle 804 tendered in the credit transaction, a merchant identifier, etc.) to the acquirer computing system 832. Subsequently, the acquirer computing system 832 can determine whether all or a portion of data or messaging associated with the credit transaction (e.g., authorization request messages, authorization response messages, etc.) should be transmitted to the issuer computing system 842 via the card network(s) 860 or whether all or a portion of the data or messaging associated with the credit transaction should be transmitted to the issuer computing system 842 via the PIN debit network 850. To do so, in some embodiments, the acquirer computing system 832 can analyze the transaction-specific data received from the POS computing system 812. For example, in some embodiments, the acquirer computing system 832 can be configured to determine that data and messaging (e.g., authorization request messages, authorization response messages, etc.) corresponding to the credit transaction should be transmitted to, or received from, the issuer computing system 842 via the PIN debit network 850 based on the BIN and/or account identifier associated with the payment vehicle 804 tendered in the credit transaction. In other examples, the acquirer computing system 832 can be configured to determine that the data and messaging corresponding to the credit transaction should be transmitted to, or received from, the issuer computing system 842 via the PIN debit network 850 based on determining that lower transaction interchange fess would be levied on the credit transaction if the data and messaging corresponding to the credit transaction are transmitted or routed via the PIN debit network 850 rather than the card network(s) 860. It should be appreciated that any other transaction parameters or characteristics can be utilized by the acquirer computing system 832 to determine whether the data and messaging corresponding to the credit transaction should be transmitted to, or received from, the issuer computing system 842 via the PIN debit network 850 or the card network(s) 860.

Additionally, in some embodiments, the PIN debit network 850 can be leveraged as an out-of-band communications network configured to support transmission of enhanced or enriched messages between the POS computing system 812 of the merchant 810 and the issuer computing system 842 of the issuer financial institution 840. To do so, in addition to transmitting the standard or conventional types of transaction-specific data (e.g. a transaction amount, a BIN or other bank identifier, an account identifier, a merchant identifier, etc.) associated with the credit transaction to the acquirer computing system 832, the POS computing system 812 can also transmit additional or non-conventional types of transaction-specific data (e.g., a loyalty account identifier associated with the consumer 802, SKU data corresponding to purchased products or services, promotional offer data, financing offer data, payment card application data, credit line increase data, etc.). Upon receiving the additional transaction-specific data (e.g., special or enhanced transaction data), the acquirer computing system 832 can be configured to split the credit transaction into two or more messages. For example, in some embodiments, the acquirer computing system 832 splits the credit transaction into an authorization request message and an enhanced data message. The authorization request message can be formatted according to conventional financial transaction messaging specifications (e.g., ISO 8583, etc.) and/or protocols for transmission via the card network(s) 860. The enhanced data message can include special or enhanced transaction data that cannot be communicated via the card network(s) 860 due to the strict financial transaction messaging specifications (e.g., ISO 8583, etc.) and/or protocol requirements employed. Thereafter, the acquirer computing system 832 can transmit/route the authorization request message to the issuer computing system 842 via the card network(s) 860. Contemporaneously with, or at substantially the same time as, the authorization request message for the credit transaction is transmitted to issuer computing system 842 via the card network(s) 860, the acquirer computing system 832 can transmit/route the enhanced data message to issuer computing system 842 via the PIN debit network 850. Subsequently, the issuer computing system 842 matches the authorization request message received via the card network(s) 860 to the enhanced data message received via the PIN debit network 850. In some embodiments, the issuer computing system can request and receive consumer response data from the POS computing system 812 via the PIN debit network 850. In the illustrative embodiment, the authorization request message is processed by the issuer computing system 842 based at least in part on, or otherwise as a function of, the received enhanced data message and, if any, the received consumer response data. Thereafter, the issuer computing system 842 generates and transmits a corresponding authorization response message, which can be selectively transmitted to the acquirer computing system 832 via the PIN debit network 850 and/or the card network(s) 860. The acquirer computing system 832 can then forward the received authorization response message to the POS computing system 812 via the PIN debit network 850 for finalization of the credit transaction.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for enhancing credit transactions, the method comprising:
 receiving, by a point of sale computing system, payment vehicle data for a plurality of credit transactions associated with purchase events, the payment vehicle data corresponding to payment vehicles tendered for the credit transactions;

detecting, based on payment vehicle data or a transaction-specific parameter, that a first credit transaction of the plurality of credit transactions is an alternate routing candidate;

transmitting, by the point of sale computing system, an authorization request message corresponding to the first credit transaction to an issuer computing system via a private network;

receiving, by the point of sale computing system, an authorization response message corresponding to the first credit transaction from the issuer computing system via a private network;

detecting, based on payment vehicle data or a transaction-specific parameter, that that a second credit transaction of the plurality of credit transactions is not an alternate routing candidate:

transmitting, by the point of sale computing system, an authorization request message corresponding to the second credit transaction to an issuer computing system via a second network out-of-band from the private network;

receiving, by the point of sale computing system, an authorization response message corresponding to the second credit transaction from the issuer computing system via the second network; and executing, by the point of sale computing system, each of the first and second credit transactions based on the authorization response messages received from the private network and the second network, respectively.

2. The method of claim 1, wherein the transaction-specific parameter comprises one or more of consumer data, loyalty data, offer data, account data, stock keeping unit (SKU) data, or a combination thereof.

3. The method of claim 1, wherein the transaction-specific parameter includes one or more of a bank identification number (BIN), an account identifier associated with the payment vehicle tendered for the first or second credit transaction, a transaction interchange fee, or a combination thereof.

4. The method of claim 1, wherein the second network does not transmit data related to the transaction-specific parameter.

5. The method of claim 1, wherein the private network comprises a personal identification number (PIN) debit network.

6. The method of claim 1, wherein the private network comprises a closed-loop communication channel connecting the point of sale computing system to the issuer computing system, an acquirer computing system.

7. The method of claim 6, wherein the private network connects a plurality of point of sale computing systems to a selected acquirer system, a selected issuer computing system, or other selected computing device, or wherein the private network connects the point of sale computing system to a plurality of acquirer systems, a plurality of issuer systems, or a plurality of redemption platform operators, or wherein the private network connects a plurality of point of sale computing systems or devices to a plurality of acquirer systems, a plurality of issuer systems, or a plurality of redemption platform operators.

8. The method of claim 1, wherein the second network comprises a card network associated with a payment vehicle.

9. A system for enhanced credit transactions, the system comprising:

a point of sale computing device comprising a processor executing instructions stored in memory, wherein the instructions cause the processor to perform a method comprising:

receiving, by a point of sale computing system, payment vehicle data for a plurality of credit transactions associated with purchase events, the payment vehicle data corresponding to payment vehicles tendered for the credit transactions;

detecting, based on payment vehicle data or a transaction-specific parameter, that a first credit transaction of the plurality of credit transactions is an alternate routing candidate;

transmitting, by the point of sale computing system, an authorization request message corresponding to the first credit transaction to an issuer computing system via a private network;

receiving, by the point of sale computing system, an authorization response message corresponding to the first credit transaction from the issuer computing system via a private network;

detecting, based on payment vehicle data or a transaction-specific parameter, that that a second credit transaction of the plurality of credit transactions is not an alternate routing candidate:

transmitting, by the point of sale computing system, an authorization request message corresponding to the second credit transaction to an issuer computing system via a second network out-of-band from the private network;

receiving, by the point of sale computing system, an authorization response message corresponding to the second credit transaction from the issuer computing system via the second network; and executing, by the point of sale computing system, each of the first and second credit transactions based on the authorization response messages received from the private network and the second network, respectively.

10. The system of claim 9, wherein the transaction-specific parameter comprises one or more of consumer data, loyalty data, offer data, account data, stock keeping unit (SKU) data, or a combination thereof.

11. The system of claim 9, wherein the transaction-specific parameter includes one or more of a bank identification number (BIN), an account identifier associated with the payment vehicle tendered for the first or second credit transaction, a transaction interchange fee, or a combination thereof.

12. The system of claim 9, wherein the second network does not transmit data related to the transaction-specific parameter.

13. The system of claim 9, wherein the private network comprises a personal identification number (PIN) debit network.

14. The system of claim 9, wherein the private network comprises a closed-loop communication channel connecting the point of sale computing system to the issuer computing system, an acquirer computing system.

15. The system of claim 14, wherein the private network connects a plurality of point of sale computing systems to a selected acquirer system, a selected issuer computing system, or other selected computing device, or wherein the private network connects the point of sale computing system to a plurality of acquirer systems, a plurality of issuer systems, or a plurality of redemption platform operators, or wherein the private network connects a plurality of point of sale computing systems or devices to a plurality of acquirer systems, a plurality of issuer systems, or a plurality of redemption platform operators.

16. The system of claim 9, wherein the second network comprises a card network associated with a payment vehicle.

17. A non-transitory computer readable medium storing instructions that, when executed by a computer, cause the computer to perform a method comprising:

receiving, by a point of sale computing system, payment vehicle data for a plurality of credit transactions associated with purchase events, the payment vehicle data corresponding to payment vehicles tendered for the credit transactions;

detecting, based on payment vehicle data or a transaction-specific parameter, that a first credit transaction of the plurality of credit transactions is an alternate routing candidate;

transmitting, by the point of sale computing system, an authorization request message corresponding to the first credit transaction to an issuer computing system via a private network;

receiving, by the point of sale computing system, an authorization response message corresponding to the first credit transaction from the issuer computing system via a private network;

detecting, based on payment vehicle data or a transaction-specific parameter, that that a second credit transaction of the plurality of credit transactions is not an alternate routing candidate:

transmitting, by the point of sale computing system, an authorization request message corresponding to the second credit transaction to an issuer computing system via a second network out-of-band from the private network;

receiving, by the point of sale computing system, an authorization response message corresponding to the second credit transaction from the issuer computing system via the second network; and executing, by the point of sale computing system, each of the first and second credit transactions event based on the authorization response messages received from the private network and the second network, respectively.

18. The method of claim 17, wherein the transaction-specific parameter comprises one or more of consumer data, loyalty data, offer data, account data, stock keeping unit (SKU) data, or a combination thereof.

19. The method of claim 17, wherein the transaction-specific parameter includes one or more of a bank identification number (BIN), an account identifier associated with the payment vehicle tendered for the first or second credit transaction, a transaction interchange fee, or a combination thereof.

20. The method of claim 17, wherein the second network does not transmit data related to the transaction-specific parameter.

* * * * *